(12) United States Patent
Wang et al.

(10) Patent No.: US 12,194,634 B2
(45) Date of Patent: Jan. 14, 2025

(54) ERROR DETECTION METHOD AND ROBOT SYSTEM BASED ON A PLURALITY OF POSE IDENTIFICATIONS

(71) Applicants: The First Affiliated Hospital of Naval Medical University, Shanghai (CN); BEIJING SURGERII ROBOTICS COMPANY LIMITED, Beijing (CN)

(72) Inventors: Linhui Wang, Shanghai (CN); Bo Yang, Shanghai (CN); Chao Zhang, Shanghai (CN); Zongqin Zhang, Shanghai (CN); Tie Zhou, Shanghai (CN); Hong Xu, Shanghai (CN); Chengwu Xiao, Shanghai (CN); Xiaofeng Wu, Shanghai (CN); Kai Xu, Beijing (CN)

(73) Assignees: THE FIRST AFFILIATED HOSPITAL OF NAVAL MEDICAL UNIVERSITY, Shanghai (CN); BEIJING SURGERII ROBOTICS COMPANY LIMITED, Beijing (CN)

( * ) Notice: Subject to any disclaimer, the term of this patent is extended or adjusted under 35 U.S.C. 154(b) by 270 days.

(21) Appl. No.: 18/091,962

(22) Filed: Dec. 30, 2022

(65) Prior Publication Data
US 2023/0219221 A1    Jul. 13, 2023

(30) Foreign Application Priority Data
Jan. 7, 2022    (CN) .......................... 202210015088.9

(51) Int. Cl.
*B25J 9/16*    (2006.01)
*B25J 13/08*    (2006.01)
*B25J 19/00*    (2006.01)

(52) U.S. Cl.
CPC ........... *B25J 9/1653* (2013.01); *B25J 9/1674* (2013.01); *B25J 9/1697* (2013.01)

(58) Field of Classification Search
CPC ...... B25J 9/1653; B25J 9/1674; B25J 9/1697; B25J 9/1692; B25J 19/0095; B25J 13/08; G05B 2219/39017
See application file for complete search history.

(56) References Cited

U.S. PATENT DOCUMENTS

2018/0071914 A1    3/2018  Heidemann et al.
2019/0291277 A1*   9/2019  Oleynik ................. B25J 9/1669
(Continued)

FOREIGN PATENT DOCUMENTS

CN    102207369 A    10/2011
CN    204584869 U    8/2015
(Continued)

OTHER PUBLICATIONS

Search Report in related Chinese Application No. 202210015088.9 dated Oct. 23, 2022 (4 pages).
(Continued)

*Primary Examiner* — Adam R Mott
*Assistant Examiner* — Heather J Keniry
(74) *Attorney, Agent, or Firm* — Bayes PLLC

(57) ABSTRACT

The present application relates to the field of error detection technology. An error detection method is provided. The error detection method includes: obtaining a target pose of an end of an operating arm; acquiring a positioning image; recognizing, in the positioning image, a plurality of pose identifications located on the end of the operating arm, the plurality of pose identifications including different pose identification patterns; determining an actual pose of the end of the operating arm based on the plurality of pose identifications; and generating a control signal related to a fault in
(Continued)

response to the target pose and the actual pose meeting an error detection condition.

20 Claims, 9 Drawing Sheets

(56) References Cited

U.S. PATENT DOCUMENTS

| | | | | |
|---|---|---|---|---|
| 2020/0108506 | A1* | 4/2020 | Goller | B25J 9/1697 |
| 2021/0053230 | A1* | 2/2021 | Mizoguchi | B25J 19/023 |

FOREIGN PATENT DOCUMENTS

| | | | |
|---|---|---|---|
| CN | 106875431 | A | 6/2017 |
| CN | 111300484 | A | 6/2020 |
| CN | 112792814 | A | 5/2021 |
| CN | 113538574 | A | 10/2021 |
| CN | 113876433 | A | 1/2022 |
| CN | 113876436 | A | 1/2022 |
| GB | 2581843 | A | 9/2020 |
| JP | 2018144165 | A | 9/2018 |

OTHER PUBLICATIONS

Extended European Search Report in related European Application No. 23150367.3 dated May 11, 2023 (10 pages).

Wu et al, Closed-Loop Pose Control and Automated Suturing of Continuum Surgical Manipulators With Customized Wrist Markers Under Stereo Vision, IEEE Robotics and Automation Letters, vol. 6, No. 4, pp. 7137-7144 (Oct. 2021) (8 pages).

Zhang et al, Configuration Transition Control of a Continuum Surgical Manipulator for Improved Kinematic Performance, IEEE Robotics and Automation Letters, vol. 4, No. 4 (Oct. 2019) (8 pages).

* cited by examiner

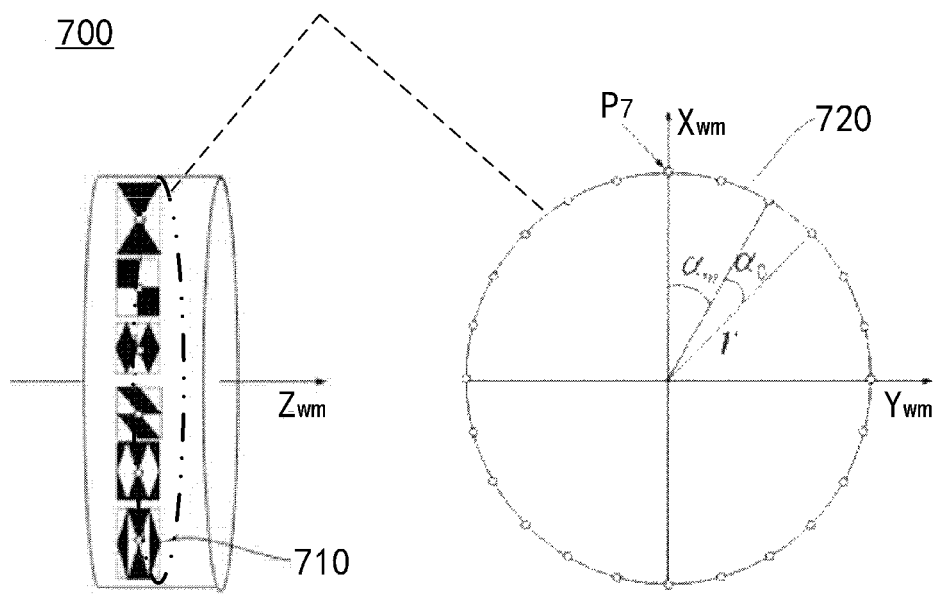

| determine around-axis angles of a plurality of pose identifications relative to a Z-axis of an end coordinate system of an operating arm based on a distribution of the plurality of pose identifications | — 801 |

| determine three-dimensional coordinates of the plurality of pose identifications relative to the end coordinate system of the operating arm based on the around-axis angles of the plurality of pose identifications | — 803 |

| determine an arrangement order of a plurality of pose identifications based on at least two of the plurality of pose identifications | — 901 |

| determine three-dimensional coordinates of the plurality of pose identifications relative to an end coordinate system of an operating arm based on the arrangement order of the plurality of pose identifications | — 903 |

FIG. 9

ERROR DETECTION METHOD AND ROBOT SYSTEM BASED ON A PLURALITY OF POSE IDENTIFICATIONS

CROSS-REFERENCE TO RELATED APPLICATION

The present application claims the benefits of priority to Chinese Application No. 202210015088.9, filed Jan. 7, 2022, the entire contents of which are expressly incorporated herein by reference.

TECHNICAL FIELD

The present disclosure relates to the field of error detection technology, and in particular to an error detection method and a robot system based on a plurality of pose identifications.

BACKGROUND

Generally, a robot system for remote operations comprises an operating arm for performing operations and a master manipulator for controlling a motion of the operating arm. In an actual scene, the operating arm is disposed to be capable of entering into an operating area, and an operator may control the motion of the operating arm in the operation area by remotely operating the master manipulator, thus an operation is performed by an effector disposed at an end of the operating arm. This robot achieves a motion control of the master manipulator to the operating arm by a motion conversion between the master manipulator and the operating arm.

The robot has a high requirement for operation accuracy and human-computer interaction experience. During a remote operation process, it is necessary to detect a pose error of the operating arm in real time, to determine whether the operating arm has correctly moved to a position and an orientation corresponding to the operation of the master manipulator according to the operator's expectations, and then to govern the working status of the robot system in real time.

SUMMARY

In some embodiments, the present disclosure provides an error detection method. The method may include: obtaining a target pose of an end of an operating arm; acquiring a positioning image; recognizing, in the positioning image, a plurality of pose identifications located on the end of the operating arm, the plurality of pose identifications including different pose identification patterns; determining an actual pose of the end of the operating arm based on the plurality of pose identifications; and generating a control signal related to a fault in response to the target pose and the actual pose meeting an error detection condition.

In some embodiments, the present disclosure provides a computer device comprising: a memory for storing at least one instruction; and a processor coupled with the memory and for executing the at least one instruction to perform the method of any of some embodiments of the present disclosure.

In some embodiments, the present disclosure provides a computer-readable storage medium for storing at least one instruction that when executed by a computer, causes the computer to perform the method of any of some embodiments of the present disclosure.

In some embodiments, the present disclosure provides a robot system comprising: a master manipulator including a robotic arm, a handle disposed on the robotic arm, and at least one master manipulator sensor disposed at at least one joint on the robotic arm, the at least one master manipulator sensor being used to obtain joint information of the at least one joint; an operating arm provided with a plurality of pose identifications at its end, the plurality of pose identifications including different pose identification patterns; at least one drive device for driving the operating arm; at least one drive device sensor coupled with the at least one drive device and for obtaining status information of the at least one drive device; an image acquisition device for acquiring a positioning image of the operating arm; and a control device configured to be connected with the master manipulator, the at least one drive device, the at least one drive device sensor and the image acquisition device, and to perform the method of any of some embodiments of the present disclosure.

BRIEF DESCRIPTION OF THE DRAWINGS

FIG. 7 shows a schematic diagram of a label disposed around the circumference of the end of the operating arm and forming a cylindrical shape according to some embodiments of the present disclosure;

FIG. 8 shows a flowchart of a method for determining three-dimensional coordinates of a plurality of pose identifications relative to an end coordinate system of the operating arm according to some embodiments of the present disclosure;

FIG. 9 shows a flowchart of a method for determining three-dimensional coordinates of a plurality of pose identifications relative to an end coordinate system of the operating arm according to other embodiments of the present disclosure;

DETAILED DESCRIPTION

Figure 1:
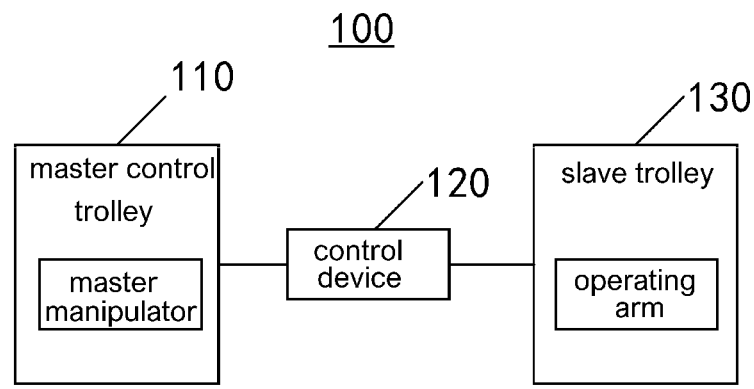
FIG. 1 shows a structure diagram of a robot system according to some embodiments of the present disclosure.

To make the solved technical problems, the used technical solutions, and the achieved technical effects of the present disclosure more clearly, the technical solutions of the embodiments of the present disclosure will be further illustrated in detail below with reference to the accompanying drawings. Those skilled in the art could understand that the described embodiments should be considered to be exemplary rather than limiting in all aspects, and should be only exemplary embodiments, but not all embodiments, of the present disclosure.

In the description of the present disclosure, it should be noted that, orientational or positional relationships indicated by the terms "center", "upper", "lower", "left", "right", "vertical", "horizontal", "inner", "outer" and the like are the orientational or positional relationships shown based on the accompanying drawings, and are only for ease of describing the present disclosure and simplifying the description, rather than indicating or implying that the apparatus or element referred to must have a specific orientation or be constructed and operated in a specific orientation, and therefore cannot be construed as limiting the present disclosure. In addition, the terms "first" and "second" are used for descriptive purposes only, and cannot be understood as indicating or implying relative importance.

In the description disclosed by the present invention, it should be noted that, unless otherwise specified and defined, the term "mount", "connected", and "connect", or "couple" should be comprehended in a broad sense. For example, the term may be a fixed connection or a detachable connection; may be a mechanical connection or an electrical connection; may be a direct connection or an indirect connection via an intermediate medium; or may be internal communication between two elements. For those of ordinary skill in the art, specific meanings of the foregoing terms in the disclosure of the present invention may be understood based on specific situations. In the disclosure of the present invention, an end close to an operator is defined as a proximal end, a proximal portion, a rear end, or a rear portion, and an end close to an object to be manipulated is defined as a distal end, a distal portion, a front end, or a front portion. Those skilled in the art could understand that embodiments of the present disclosure may be applied to an operating arm disposed on a mechanical device operating in a variety of environments comprising but not limited to, on the surface of the earth, underground, underwater, in space and within living organisms.

In the present disclosure, the term "position" refers to a positioning of an object or a portion of the object in three-dimensional space (e.g., variations in Cartesian X, Y, and Z coordinates may be used to describe three translational degrees of freedom, e.g., three translational degrees of freedom along the Cartesian X-axis, Y-axis, and Z-axis respectively). In the present disclosure, the term "orientation" refers to a rotation setting of an object or a portion of the object (e.g., three rotational degrees of freedom, which may be described using roll, pitch, and deflection). In the present disclosure, the term "pose" refers to a combination of a position and an orientation of an object or a portion of the object. For example, it may be described using six parameters in the six degrees of freedom mentioned above. In the present disclosure, a pose of a handle of a master manipulator may be represented by a collection of joint information of joints of the master manipulator (e.g., a one-dimensional matrix composed of these joint information). The pose of the operating arm may be determined by drive information of the operating arm. In the present disclosure, the joint information of the joint may include an angle of a respective joint rotating relative to a corresponding joint axis or a distance of the respective joint moving relative to an initial position.

In the present disclosure, a reference coordinate system may be understood as a coordinate system capable of describing a pose of an object. According to actual positioning requirements, the reference coordinate system may be chosen to take an origin of a virtual reference object or an origin of a real reference object as an origin of the coordinate system. In some embodiments, the reference coordinate system may be a world coordinate system, or a coordinate system of the space where the master manipulator, the operating arm, or a camera is located, or the operator's own perception coordinate system and the like.

In the present disclosure, the object may be understood as a subject or a target needed to be positioned, such as the operating arm or the end of the operating arm. A pose of the operating arm or a portion (for example, an end) thereof may refer to a pose of the coordinate system defined by the operating arm or the portion thereof relative to the reference coordinate system.

FIG. 1 shows a structure diagram of a robot system 100 according to some embodiments of the present disclosure. In some embodiments, as shown in FIG. 1, the robot system 100 may include a master control trolley 110, a slave trolley 130 and a control device 120. The control device 120 may be communicatively connected with the master control trolley 110 and the slave trolley 130, for example, via cable connections, or via wireless connections, to achieve the communication with the master control trolley 110 and the slave trolley 130. The master control trolley 110 includes a master manipulator for an operator to operate remotely, and the slave trolley 130 includes at least one operating arm for performing an operation. With the control device 120 to achieve a master-slave mapping between the master manipulator in the master control trolley 110 and the operating arm in the slave trolley 130, a motion control of the operating arm by the master manipulator is achieved. In some embodiments, the operating arm is disposed to be capable of entering into an operating area through a tube sleeve, sheath sleeve, etc. The tube sleeve and the sheath sleeve may be fixed at an opening (such as an artificial opening or a natural opening) formed on a wall surface, animal body, etc. The operating area may be an area for operation. The operating arm may be a continuum deformable arm, and a distal end of the operating arm may be provided with an end instrument (e.g., an effector) comprising, but not limited to, excavation instrument, underwater operating instrument, sorting instrument, surgical instrument, etc. Those skilled in the art will appreciate that the master control trolley 110 and the slave trolley 130 may employ other structures or forms, such as a base, a bracket or a building and the like.

In some embodiments, in addition to an operating tool, the operating arm may also be used as a vision tool. The end instrument of the vision tool may include, but is not limited to, an image acquisition device or a lighting device and the like. In some embodiments, the master control trolley may include the master manipulator and a display for displaying an image of the operating area. The image acquisition device may be used to acquire images of the operating area and transmit the acquired images to the slave trolley. The image is displayed on a display of the slave trolley after being processed by a video processing module in the slave trolley. The operator obtains poses of the end of the operating arm relative to the reference coordinate system in real time from the images in the display. The pose of the master manipulator relative to the reference coordinate system is an orientation that the operator actually perceives. A pose change felt by the operator in remotely operating the master manipulator and an orientation change of the end of the operating arm perceived by the operator in the display conform to a preset pose relationship. In this way, by remotely operating the master manipulator, a pose change of the master manipulator is converted into a pose change of the end of the operating arm based on the preset pose relationship, and then a pose control of the end of the operating arm is achieved. In this way, when the operator holds a handle of the master manipulator to move so as to operate the operating arm, based on a principle of an intuitive operation, an amount of orientation change of the end instrument of the operating arm felt by the operator is kept to be consistent with an amount of orientation change of the master manipulator felt by the operator, which facilitates to improve remote operation feeling and remote operation accuracy of the operator.

During the remote operation process, sometimes the operating arm cannot move accurately to a position and an orientation corresponding to the operation of the master manipulator as expected by the operator. In the present disclosure, a pose error of the operating arm is detected in the process of the remote operation, and it is determined whether the operating arm is correctly moved according to the operator's expectation, such that the working status of the robot system is governed in real time. Those skilled in the art may understand that a pose error detection method according to some embodiments of the present disclosure may also be performed in a non-remote operation process.

Figure 2:
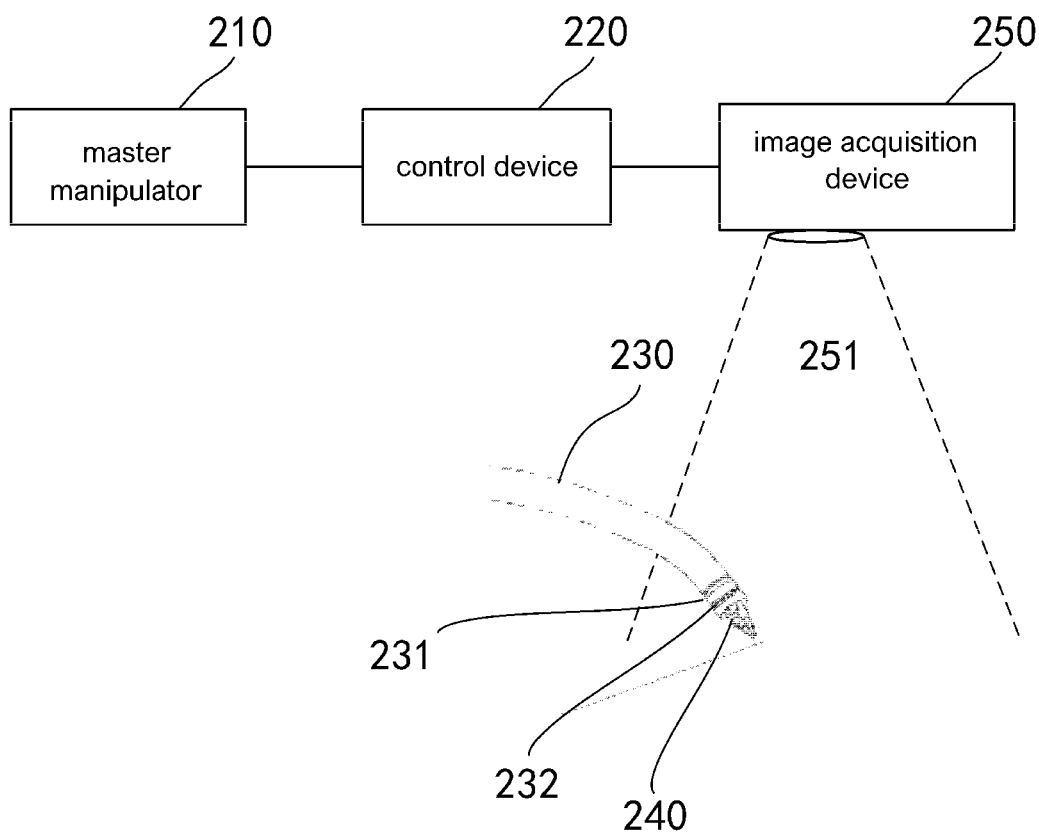
FIG. 2 shows a schematic diagram of an error detection system according to some embodiments of the present disclosure.

FIG. 2 shows a schematic diagram of an error detection system 200 according to some embodiments of the present disclosure. As shown in FIG. 2, the system 200 may include a master manipulator 210, a control device 220, an operating arm 230, and an image acquisition device 250. The operating arm 230 may be implemented by a deformable arm or a rigid arm. In some embodiments, the operating arm 230 may include an operating arm end 231 at the end or distal end, and the operating arm end 231 may be provided with an end instrument 240.

The control device 220 may be communicatively connected with at least one drive device, send drive information to the drive device, and control a motion the operating arm 230 to enable the operating arm end 231 to move to a desired position and orientation. For example, the at least one drive device controlling the motion of the operating arm 230 may be a servo motor, and may accept an instruction of the control device to control the motion of the operating arm 230. In some embodiments, the control device 220 may determine a target pose of the operation arm end 231 based on the pose of the master manipulator 210 and the mapping relationship between the master manipulator 210 and the operating arm 230.

Figure 6:
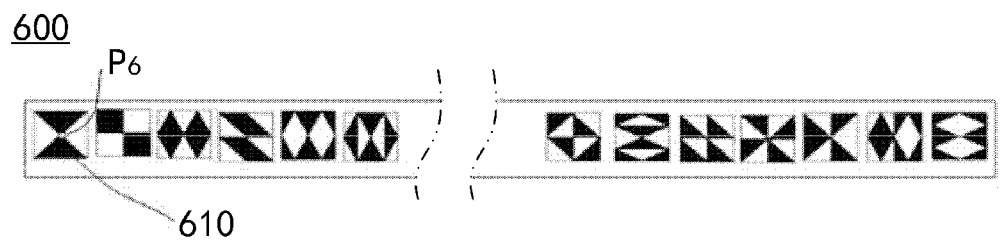
FIG. 6 shows a schematic diagram of a label comprising a plurality of pose identifications according to some embodiments of the present disclosure.

The image acquisition device 250 is communicatively connected with the control device 220. In some embodiments, the image acquisition device 250 may be used to acquire a positioning image, and the image acquisition device 250 may include, but is not limited to, a dual-lens image acquisition device or a single-lens image acquisition device, such as a binocular or monocular camera. The positioning image may include an image of a part or whole of the operating arm 230 located in the operating area. In some embodiments, the image acquisition device 250 may be used to acquire an image of the operating arm end 231. The operating arm end 231 may be provided with a plurality of different pose identifications, and these pose identifications include different pose identification patterns. For example, the operating arm end 231 may be provided with a positioning label 232 (the positioning tag 232 may be, for example, a label 600 as shown in FIG. 6). The positioning label 232 may include a plurality of pose identifications including different pose identification patterns (as described in detail below).

As shown in FIG. 2, the operating arm end 231 is within the field of view 251 of the image acquisition device 250, thus the acquired positioning image may include an image of the operating arm end 231. According to different application scenes, the image acquisition device 250 may be an industrial camera, an underwater camera, a micro electronic camera, an endoscopic camera, etc. In some embodiments, the image acquisition device 250 may be fixed in position or changeable in position, for example, an industrial camera which is fixed in a monitoring position or an endoscopic camera with adjustable orientation. In some embodiments, the image acquisition device 250 may achieve at least one of visible band imaging, infrared band imaging, CT (Computed Tomography, electronic computed tomography) imaging and acoustic imaging. According to the different types of images acquired, those skilled in the art may choose different image acquisition devices as the image acquisition device 250.

In some embodiments, the control device 220 may receive the positioning image from the image acquisition device 250, and process the positioning image. For example, the control device 220 may recognize, in the positioning image, a plurality of pose identifications located on the operating arm end 231, and determine the pose of the operating arm end 231 relative to a reference coordinate system (e.g., a world coordinate system) as an actual pose of the operating arm end 231.

Figure 17:
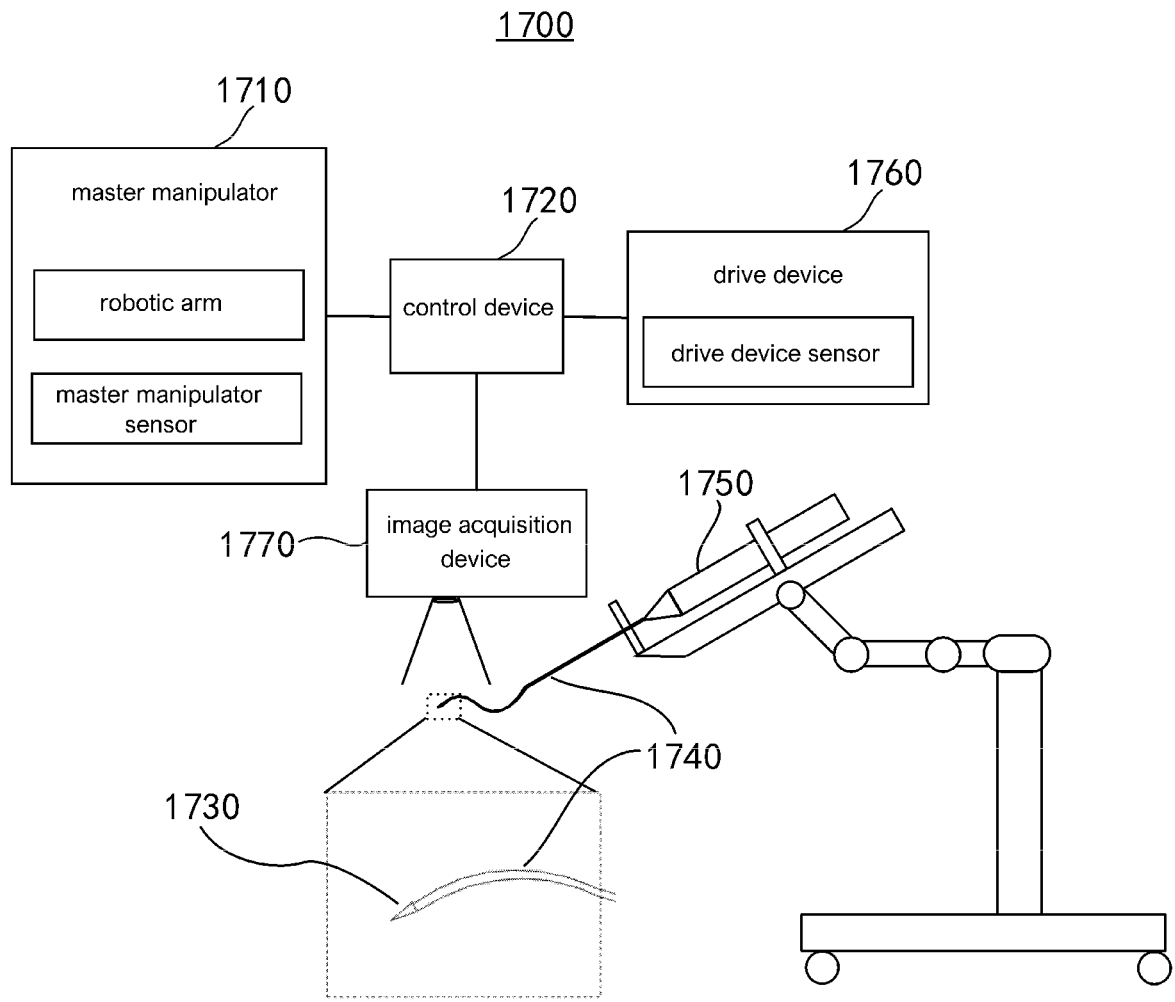
FIG. 17 shows a schematic diagram of a robot system according to some embodiments of the present disclosure.

In the present disclosure, the control device 220 may perform an error detection on the operating arm 230 based on the target pose and the actual pose of the operating arm end 231, determine whether the operating arm end 231 accurately moved to a position and an orientation corresponding to the operation of the master manipulator 210, and then determine whether the operating arm 230 has failed and generate a corresponding control signal. In some embodiments, the control device 220 may also determine the target pose and the actual pose of the operating arm end 231 at a predetermined period, to perform the error detections on the operating arm 230 in real time by a plurality of detection cycles. Those skilled in the art should understand that the system 200 may be applied to a dedicated or general-purpose robot system in a plurality of fields (e.g., medical, industrial manufacturing, etc.), such as a robot system 100 as shown in FIG. 1, or a robot system 1700 as shown in FIG. 17. As an example, the system 200 may be applied to a robot system such as a surgical robot, etc., and the end instrument 240 disposed at a distal end of the operating arm end 231 may be, for example, a surgical effector.

Figure 3:
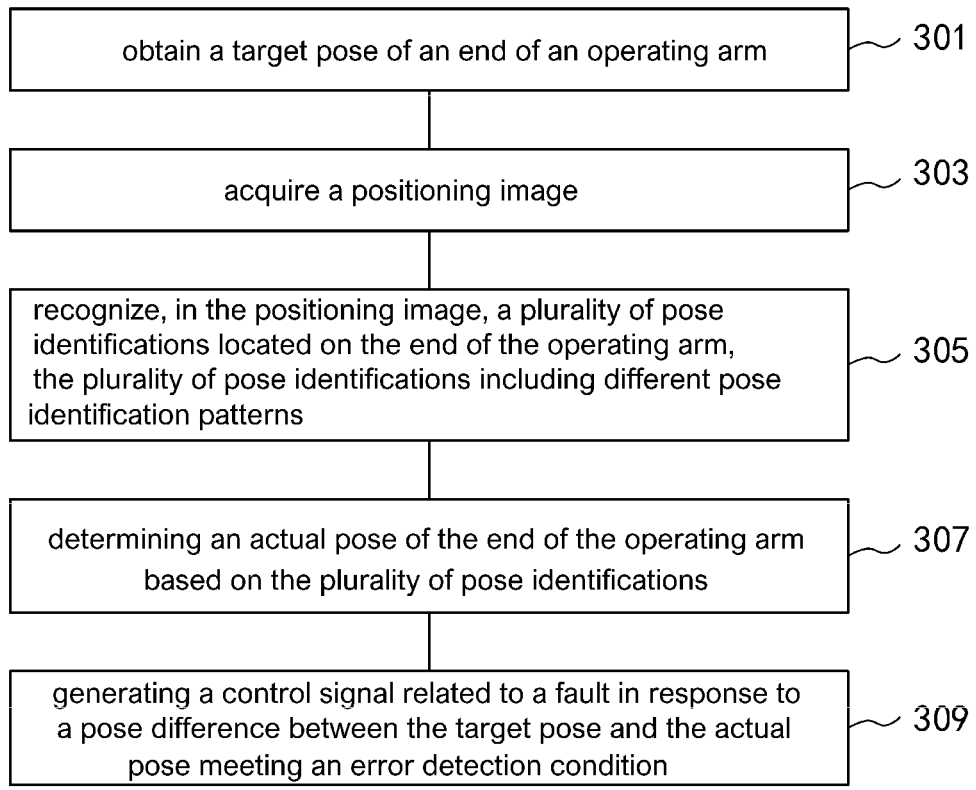
FIG. 3 shows a flowchart of an error detection method according to some embodiments of the present disclosure.

Some embodiments of the present disclosure provide an error detection method for the operating arm of the robot system. FIG. 3 shows a flowchart of an error detection method 300 (hereinafter referred to as "method 300") according to some embodiments of the present disclosure. The method 300 may be implemented or performed by hardware, software or firmware. In some embodiments, the method 300 may be performed by a robot system (e.g., a robot system 100 as shown in FIG. 1, or a robot system 1700 as shown in FIG. 17). In some embodiments, the method 300 may be implemented as computer-readable instructions. These instructions may be read and performed by a general-purpose processor or a dedicated processor (e.g., a control device 120 as shown in FIG. 1, a control device 220 as shown in FIG. 2, or a control device 1720 as shown in FIG. 17). For example, the control device for the robot system may include a processor configured to perform the method 300. In some embodiments, these instructions may be stored on a computer-readable medium.

Referring to FIG. 3, at step 301, a target pose of an end of an operating arm is obtained. In some embodiments, the target pose of the end of the operating arm may be determined according to a pose of a master manipulator based on a master-slave motion mapping relationship between the pose of the master manipulator and the pose of the end of the operating arm. An exemplary method for obtaining the target pose of the end of the operating arm includes a method as shown in FIG. 4.

Figure 4:
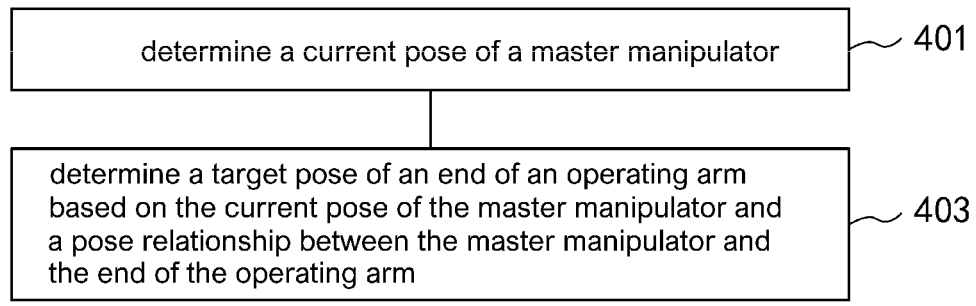
FIG. 4 shows a flowchart of a method for determining a target pose of an end of an operating arm according to some embodiments of the present disclosure.

FIG. 4 shows a flowchart of a method 400 for determining the target pose of the end of the operating arm according to some embodiments of the present disclosure. As shown in FIG. 4, some or all of the steps in the method 400 may be performed by a control device (e.g., a control device 120 as shown in FIG. 1, a control device 220 as shown in FIG. 2 or a control device 1720 as shown in FIG. 17). Some or all of the steps in the method 400 may be implemented by software, firmware, and/or hardware. In some embodiments, the method 400 may be performed by a robot system (e.g., a robot system 100 as shown in FIG. 1, or a robot system 1700 as shown in FIG. 17). In some embodiments, the method 400 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium.

Figure 5:
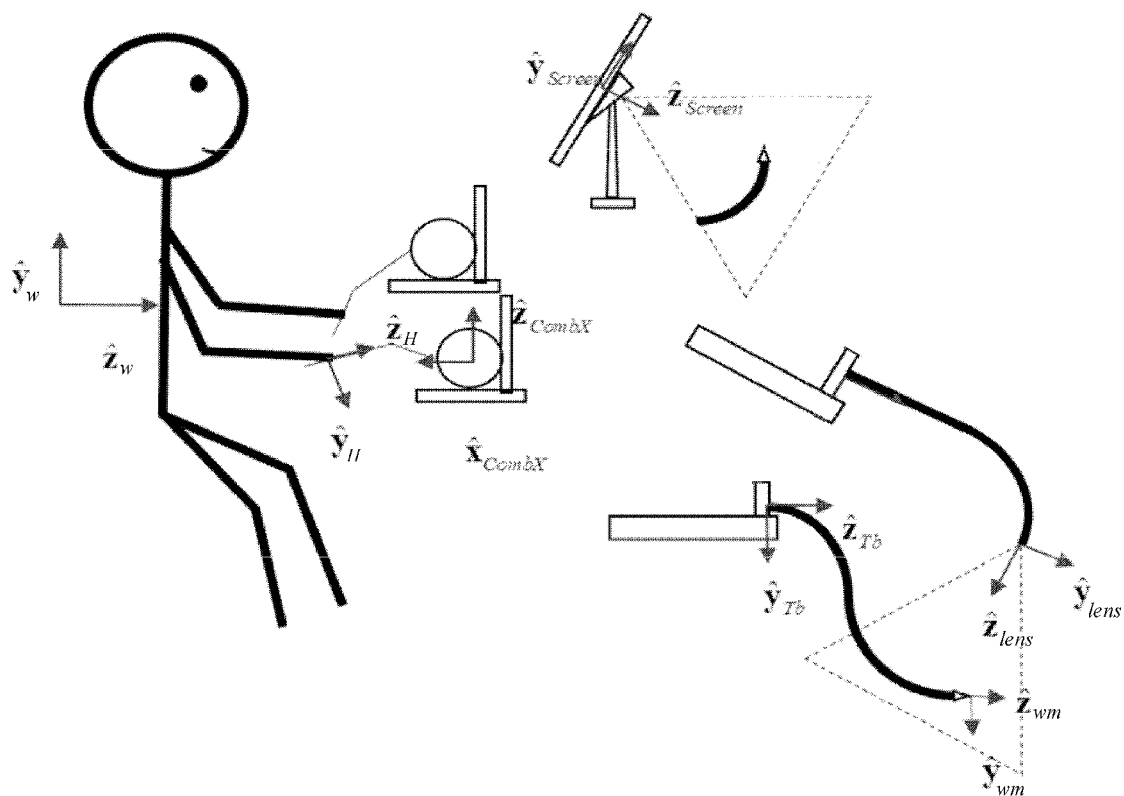
FIG. 5 shows a schematic diagram of coordinate systems in a master-slave motion mapping according to some embodiments of the present disclosure.

FIG. 5 shows a schematic diagram of coordinate systems in a master-slave motion mapping according to some embodiments of the present disclosure. The coordinate systems in FIG. 5 are defined as follows: an operating arm base coordinate system {Tb}, in which an origin is located at a base of the operating arm or an exit of a sheath sleeve, $\hat{z}_{Tb}$ is consistent with an extended line of the base or an axial direction of the sheath sleeve, and a direction of $\hat{y}_{Tb}$ is shown as in FIG. 5. A camera coordinate system {lens}, in which an origin is located at a center of the camera, a camera axis direction is a direction of $\hat{z}_{lens}$, and an upper direction after the field of view is straightened is a direction of $\hat{y}_{lens}$. An end coordinate system {wm} of the operating arm, in which an origin is located at the end of the operating arm, $\hat{z}_{wm}$ is consistent with an axis direction of the end, and a direction of $\hat{y}_{wm}$ is shown in FIG. 5. A reference coordinate system {w}, which may be the coordinate system of the space where the master manipulator or the operating arm or the camera is located, for example the operating arm base coordinate system {Tb}, or the world coordinate system, as shown in FIG. 5. In some embodiments, the operator's somatosensation may be used as a reference. When the operator is sitting upright in front of a main console, a somatosensation upward direction is a direction of $\hat{y}_w$, and a somatosensation forward direction is a direction of $\hat{z}_w$. A display coordinate system {Screen}, in which an origin is at a center of the display, an inward direction perpendicular to a screen picture is a positive direction of $\hat{z}_{Screen}$ and an upward direction of the screen picture is a direction of $\hat{y}_{screen}$. A master manipulator base coordinate system {CombX}, in which its coordinate axis directions are shown in FIG. 5. A master manipulator's handle coordinate system {H}, in which its coordinate axis directions are shown in FIG. 5.

The coordinate systems as shown in FIG. 5 are taken as an example below, and the method 400 for determining the target pose of the end of the operating arm is described. However, those skilled in the art may understand that other coordinate system definitions may be used to implement the method 400 for determining the target pose of the end of the operating arm.

Referring to FIG. 4, at step 401, a current pose of the master manipulator may be determined. The current pose includes a current position and a current orientation. In some embodiments, the current pose of the master manipulator may be a pose relative to the master manipulator base coordinate system {CombX}. For example, the pose of the master manipulator is a pose of a coordinate system defined by the handle of the master manipulator or a portion thereof relative to the master manipulator base coordinate system {CombX} (for example, a coordinate system defined by a bracket or base on which the master manipulator is located, or the world coordinate system). In some embodiments, determining the current position of the master manipulator comprises determining the current position of the handle of the master manipulator relative to the master manipulator base coordinate system {CombX}, and determining the current orientation of the master manipulator comprises determining the current orientation of the handle of the master manipulator relative to the master manipulator base coordinate system {CombX}.

In some embodiments, the current pose of the master manipulator may be determined based on a coordinate transformation. For example, the current pose of the handle of the master manipulator may be determined based on a transformation relationship between the coordinate system {H} of the handle and the master manipulator base coordinate system {CombX}. In general, the master manipulator base coordinate system {CombX} may be disposed on the bracket or base where the master manipulator is located, and the master manipulator base coordinate system {CombX} remains unchanged during a remote operation.

In some embodiments, the current pose of the master manipulator may be determined based on a master manipulator sensor. In some embodiments, current joint information of at least one joint of the master manipulator is received, and based on the current joint information of the at least one joint, the current pose of the master manipulator is determined. For example, the current pose of the master manipulator is determined based on the current joint information of the at least one joint obtained by the master manipulator sensor. The master manipulator sensor is disposed at at least one joint position of the master manipulator. For example, the master manipulator includes at least one joint, and at least one master manipulator sensor is disposed at the at least one joint. Based on the master manipulator sensor obtaining the joint information (a position or an angle) of a corresponding joint, the current pose of the master manipulator is calculated. For example, the current position and current orientation of the master manipulator are calculated based on a forward kinematics algorithm.

In some embodiments, the master manipulator includes at least one orientation joint for controlling the orientation of the handle. Determining the current orientation of the handle of the master manipulator includes: obtaining the joint information of the at least one orientation joint, and determining the current orientation of the master manipulator based on the joint information of the at least one orientation joint. The master manipulator includes a robotic arm including a position joint and an orientation joint. The orientation joint adjusts an orientation of the master manipulator, and the master manipulator is controlled to reach a target orientation through one or more orientation joints. The position joint adjusts a position of the master manipulator, and the master manipulator is controlled to reach a target position through one or more position joints. The master manipulator sensors are disposed at the orientation joint and the position joint of the robotic arm, for obtaining the joint information (the position or the angle) corresponding to the orientation joint and the position joint. According to the obtained joint information, the current pose of the handle of the master manipulator relative to the master manipulator base coordinate system {CombX} may be determined. For example, the master manipulator may include 7 joints, wherein joints 5, 6 and 7 are orientation joints for adjusting the orientation of the handle of the master manipulator. Based on the joint information (such as the angle) obtained by the master manipulator sensor of the orientation joint and the forward kinematics algorithm, the current orientation of the master manipulator is calculated. Joints 1, 2 and 3 are position joints for adjusting the position of the handle of the master manipulator. Based on the joint information (such as the position) obtained by the master manipulator sensor of the position joint and the forward kinematics algorithm, the current position of the master manipulator is calculated.

At step 403, the target pose of the end of the operating arm may be determined based on the current pose of the master manipulator and the pose relationship between the master manipulator and the end of the operating arm. For example, the master-slave mapping relationship between the master manipulator and the end of the operating arm is established, and the pose of the end of the operating arm is controlled by remotely operating the master manipulator. The pose relationship includes the relationship between the pose of the end of the operating arm relative to the reference coordinate system {w} and the pose of the master manipulator relative to the reference coordinate system {w}. The reference coordinate system {w} includes the coordinate system of the space where the master manipulator or operating arm or the camera is located, or the world coordinate system.

In some embodiments, the pose relationship between the master manipulator and the end of the operating arm may include a relationship between an amount of pose change of the master manipulator and an amount of pose change of the end of the operating arm, such as equal or proportional. Determining the target pose of the end of the operating arm includes: determining a previous pose of the master manipulator, determining a starting pose of the end of the operating arm, and determining a target pose of the end of the operating arm based on the previous pose and the current pose of the master manipulator and the starting pose of the end of the operating arm. The previous pose and the current pose of the master manipulator may be the pose of the handle of the master manipulator relative to the master manipulator base coordinate system {CombX}. The starting pose and target pose of the end of the operating arm may be the pose of the end of the operating arm relative to the operating arm base coordinate system {Tb}.

The pose of the end of the operating arm may include the pose of the end coordinate system {wm} of the operating arm relative to the operating arm base coordinate system {Tb}. The operating arm base coordinate system {Tb} may be the coordinate system of a base to which the operating arm is mounted, the coordinate system of a sheath sleeve through which the end of the operating arm passes (for example, the coordinate system of an exit of the sheath sleeve), the coordinate system of a Remote Center of Motion (RCM) of the operating arm, etc. For example, the operating arm base coordinate system {Tb} may be disposed at the exit position of the sheath sleeve, and the operating arm base coordinate system {Tb} may remain unchanged during the remote operation. A coordinate system transformation may be performed on the starting pose of the end of the operating arm to obtain a pose relative to other coordinate systems (for example, the reference coordinate system).

In some embodiments, previous joint information of at least one joint of the master manipulator may be received, and based on the previous joint information of the at least one joint, the previous pose of the master manipulator is determined. For example, based on the master manipulator sensor reading the joint information of the master manipulator at a previous time and a current time, the previous pose and the current pose of the handle of the master manipulator are determined. Based on a previous position and a current position of the handle relative to the master manipulator base coordinate system {CombX}, the amount of position change of the handle of the master manipulator is determined. Based on a previous orientation and a current orientation of the handle relative to the master manipulator base coordinate system {CombX}, the amount of orientation change of the handle of the master manipulator is determined.

In some embodiments, an actual pose of the end of the operating arm obtained in a previous round of detection cycle may be received as a starting pose of the end of the operating arm in a current round of detection cycle. For example, in each round of detection cycle, the camera may take a positioning image of the end of the operating arm, and a plurality of pose identifications located at the end of the operating arm may be recognized through the positioning image, thereby determining the actual pose of the end of the operating arm (described in more detail below), which may be used as the starting pose of the end of the operating arm in a next round of detection cycle. For example, for a first round of detection cycle, an initial pose of the end of the operating arm (for example, the zero position of the operating arm) may be used as a starting pose for the first round of detection cycle.

In some embodiments, the amount of pose change of the master manipulator may be determined based on the previous pose and the current pose of the master manipulator. The amount of pose change of the end of the operating arm may be determined based on the amount of pose change of the master manipulator and the pose relationship between the master manipulator and the end of the operating arm. The target pose of the end of the operating arm may be determined based on the starting pose of the end of the operating arm and the amount of pose change of the end of the operating arm.

The pose relationship may include a position relationship and an orientation relationship. The position relationship between the master manipulator and the end of the operating arm may include a relationship between an amount of position change of the master manipulator and an amount of position change of the end of the operating arm, such as equal or proportional. The orientation relationship between the master manipulator and the end of the operating arm may include a relationship between an amount of orientation change of the master manipulator and an amount of orientation change of the end of the operating arm, such as equal or proportional.

In some embodiments, the method 400 further comprises: determining the current position of the handle of the master manipulator relative to the master manipulator base coordinate system, determining the previous position of the handle relative to the master manipulator base coordinate system, determining the starting position of the end of the operating arm relative to the operating arm base coordinate system, and determining the target position of the end of the operating arm relative to the operating arm base coordinate system based on the previous position and the current position of the handle relative to the master manipulator base coordinate system, the transformation relationship between the operating arm base coordinate system and the master manipulator base coordinate system, and the starting position of the end of the operating arm relative to the operating arm base coordinate system. For example, the previous position of the master manipulator is determined based on the joint information read by the master manipulator sensor and corresponding to the master manipulator at the previous time, and the current position of the master manipulator is determined based on the joint information read by the master manipulator sensor and corresponding to the master manipulator at the current time. The amount of position change of the master manipulator is determined based on the previous position and the current position of the handle relative to the master manipulator base coordinate system {CombX}. The starting position of the end of the operating arm is determined based on the actual pose of the end of the operating arm obtained in the previous round of detection cycle. The amount of position change of the end of the operating arm is determined based on the amount of position change of the master manipulator and the pose relationship between the master manipulator and the end of the operating arm. The target position of the end of the operating arm is determined based on the starting position of the end of the operating arm and the amount of position change of the end of the operating arm.

In some embodiments, the method 400 further comprises: determining the current orientation of the handle of the master manipulator relative to the master manipulator base coordinate system, determining the previous orientation of the handle relative to the master manipulator base coordinate system, determining the starting orientation of the end of the operating arm relative to the operating arm base coordinate system, and determining the target orientation of the end of the operating arm relative to the operating arm base coordinate system based on the previous orientation and the current orientation of the handle relative to the master manipulator base coordinate system, the transformation relationship between the operating arm base coordinate system and the master manipulator base coordinate system, and the starting orientation of the end of the operating arm relative to the operating arm base coordinate system. For example, the previous orientation of the master manipulator is determined based on the joint information read by the master manipulator sensor and corresponding to the master manipulator at the previous time, and the current orientation of the master manipulator is determined based on the joint information read by the master manipulator sensor and corresponding to the master manipulator at the current time. The amount of orientation change of the master manipulator is determined based on the previous orientation and the current orientation of the handle relative to the master manipulator base coordinate system {CombX}. The starting orientation of the end of the operating arm is determined based on the actual pose of the end of the operating arm obtained in the previous round of detection cycle. The amount of orientation change of the end of the operating arm is determined based on the amount of orientation change of the master manipulator and the pose relationship between the master manipulator and the end of the operating arm. The target orientation of the end of the operating arm is determined based on the starting orientation of the end of the operating arm and the amount of orientation change of the end of the operating arm.

In some embodiments, the pose relationship comprises: the amount of position change of the end of the operating arm in the reference coordinate system {w} being proportional to the amount of position change of the master manipulator in the reference coordinate system {w}, which may be expressed as:

$$^{w}\Delta P_{wm} = k \cdot {}^{w}\Delta P_{H} \quad (1)$$

In the equation (1), $^{w}\Delta P_{wm}$ on the left side represents the amount of position change of the end of the operating arm relative to the reference coordinate system {w}, and $^{w}\Delta P_{H}$ on the right side represents the amount of position change of the master manipulator relative to the reference coordinate system {w}. And, $^{w}\Delta P_{wm}$ is in a proportional relationship with $^{w}\Delta P_{H}$, and the scale factor is k.

In some embodiments, the amount of position change of the master manipulator $^{w}\Delta P_{H}$ may be determined based on the previous position $^{w}P_{H(t0)}$ and the current position $^{w}\Delta P_{H}$ of the master manipulator relative to the reference coordinate system {w}. For example, at the time t0 in a remote operation, the previous position $^{w}P_{H(t0)}$ of the handle of the master manipulator relative to the reference coordinate system {w} may be determined based on the joint information of the master manipulator obtained by the master manipulator sensor. At the time t1 in the remote operation, the current position $^{w}P_{H}$ of the handle of the master manipulator relative to the reference coordinate system {w} may be determined based on the joint information of the master manipulator obtained by the master manipulator sensor. The amount of position change of the master manipulator $^{w}\Delta P_{H}$ is obtained based on the previous position $^{w}P_{H(t0)}$ of the master manipulator at the time t0 and the current position $^{w}P_{H}$ of the master manipulator at the time t1. In some embodiments, a plurality of control cycles for the operating arm may be included between the time t0 and the time t1. The time t0 may be the time when the remote operation instruction is triggered or the time when the plurality of control cycles start, and the time t1 may be the time when the remote operation instruction ends or the time when the plurality of control cycles are completed.

In some embodiments, the amount of position change $^{w}\Delta P_{wm}$ of the end of the operating arm may be determined based on the starting position $^{w}P_{wmS}$ and the target position $^{w}P_{wmT}$ of the end of the operating arm relative to the reference coordinate system {w}. In some embodiments, a detection cycle (e.g., t0 to t1) of the operating arm may cover a plurality of control cycles for the operating arm. For example, the previous round of detection cycle for the operating arm may end at time to, and the current round of detection cycle for the operating arm may start at time t0 and end at time t1. In some embodiments, the actual position $^{w}P_{wmR(t0)}$ in the actual pose of the end of the operating arm obtained in the previous round of detection cycle (e.g., at time t0) may be determined as the starting position $^wP_{wmS}$ of the end of the operating arm relative to reference coordinate system {w} in the current detection cycle. The target position $^wP_{wmT}$ of the end of the operating arm relative to the reference coordinate system {w} may be determined based on the amount of position change $^w\Delta P_H$ of the handle and the starting position $^wP_{wmS}$ of the end of the operating arm relative to the reference coordinate system {w}.

In the equation (1), the amount of position change $^w\Delta P_{wm}$ of the end of the operating arm relative to the reference coordinate system {w} may be represented by a difference between the target position $^wP_{wmT}$ of the end of the operating arm relative to the reference coordinate system {w} and the starting position $^wP_{wmS}$ of the end of the operating arm (such as, at time t0) relative to the reference coordinate system {w}, as shown in equation (2), $$^w\Delta P_{wm} = {^wP_{wmT}} - {^wP_{wmS}} \quad (2)$$

In the equation (1), the amount of position change $^w\Delta P_H$ of the master manipulator relative to the reference coordinate system {w} may be represented by a difference between the current position $^wP_H$ of the master manipulator (e.g., at time t1) relative to the reference coordinate system {w} and the previous position $^wP_{H(t0)}$ of the master manipulator (e.g., in time t0) relative to the reference coordinate system {w}, as shown in equation (3), $$^wP_{H(t0)} \quad (3)$$

In some embodiments, by multiplying the left and right sides of equation (1) by the same matrix $^{Tb}R_w$ respectively, an equation (4) is obtained based on the equations (1) to (3), $$^{Tb}R_w({^wP_{wmT}} - {^wP_{wmS}}) = k \cdot {^{Tb}R_w}({^wP_H} - {^wP_{H(t0)}}) \quad (4)$$

An equation (5) is obtained based on the left side of the equation (4), $$^{Tb}R_w({^wP_{wmT}} - {^wP_{wmS}}) = {^{Tb}P_{wmT}} - {^{Tb}P_{wmS}} \quad (5)$$

An equation (6) is obtained based on the right side of the equation (4), $$k \cdot {^{Tb}R_w}({^wP_H} - {^wP_{H(t0)}}) = k \cdot {^{Tb}R_{CombX}}({^{CombX}P_H} - {^{CombX}P_{H(t0)}}) \quad (6)$$

An equation (7) is obtained based on the equations (5) and (6), $$^{Tb}P_{wmT} = k \cdot {^{Tb}R_{CombX}}({^{CombX}P_H} - {^{CombX}P_{H(t0)}}) + {^{Tb}P_{wmS}} \quad (7)$$

Based on the equation (7), in some embodiments, the target position $^{Tb}P_{wmT}$ of the end of the operating arm relative to the operating arm base coordinate system {Tb} may be determined based on the previous position $^{CombX}P_{H(t0)}$ and the current position $^{CombX}P_H$ of the handle relative to the master manipulator base coordinate system {CombX}, the current position $^{Tb}P_{wmS}$ of the end of the operating arm relative to the operating arm base coordinate system {Tb}, the transformation relationship $^{Tb}R_{CombX}$ between the master manipulator base coordinate system {CombX} and the operating arm base coordinate system {Tb}.

In some embodiments, the orientation of the end of the operating arm in the reference coordinate system {w} is consistent with the orientation of the master manipulator in the reference coordinate system {w}. In some embodiments, the amount of orientation change of the end of the operating arm relative to the reference coordinate system {w} is consistent with the amount of orientation change of the master manipulator relative to the reference coordinate system {w}, which may be expressed as:

$$^wR_{wmS\text{-}wmT} = {^wR_{H(t0)\text{-}H}} \quad (8)$$

In the equation (8), $^wR_{wmS\text{-}wmT}$ on the left side represents the amount of orientation change of the orientation of the end of the operating arm relative to the reference coordinate system {w}, and $^wR_{H(t0)\text{-}H}$ on the right side represents the amount of orientation change of the master manipulator relative to the reference coordinate system {w}.

In some embodiments, the amount of orientation change $^wR_{H(t0)\text{-}H}$ of the master manipulator may be determined based on the previous orientation $^wR_{H(t0)}$ and the current orientation $^wR_H$ of the master manipulator relative to the reference coordinate system {w}. For example, at the time t0 in the remote operation, the previous orientation $^wR_{H(t0)}$ of the handle of the master manipulator relative to the reference coordinate system {w} may be determined based on the joint information of the master manipulator obtained by the master manipulator sensor. At the time t1 in the remote operation, the current orientation $^wR_H$ of the handle of the master manipulator relative to the reference coordinate system {w} may be determined based on the joint information of the master manipulator obtained by the master manipulator sensor. The amount of orientation change $^wR_{H(t0)\text{-}H}$ of the master manipulator may be obtained based on the previous orientation $^wR_{H(t0)}$ of the master manipulator at the time t0 and the current orientation $^wR_H$ of the master manipulator at the time t1. Similarly, in some embodiments, the time t0 to the time t1 may correspond to a single detection cycle, and may include a plurality of control cycles for the operating arm. The time t0 may be the time when the remote operation instruction is triggered or the time when the detection cycle starts, and the time t1 may be the time when the remote operation instruction ends or the time when the detection cycle is completed.

In some embodiments, the amount of orientation change $^wR_{wmS\text{-}mT}$ of the end of the operating arm may be determined based on the starting orientation $^wR_{wmS}$ and the target orientation $^wR_{wmT}$ of the end of the operating arm relative to the reference coordinate system {w}. Similarly, in some embodiments, a detection cycle (e.g., t0 to t1) for the operating arm may cover a plurality of control cycles for the operating arm. For example, the previous round of detection cycle for the operating arm may end at time to, and the current round of detection cycle for the operating arm may start at time t0 and end at time t1. In some embodiments, the actual orientation $^wR_{wmR(t0)}$ in the actual pose of the end of the operating arm obtained in the previous round of detection cycle (e.g., at time to) may be determined as the starting orientation $^wR_{wmS}$ of the end of the operating arm relative to reference coordinate system {w} in the current detection cycle. The target orientation $^wR_{wmT}$ of the end of the operating arm relative to the reference coordinate system {w} may be determined based on the amount of orientation change $^wR_{H(t0)\text{-}H}$ of the handle and the starting orientation $^wR_{wmS}$ of the end of the operating arm relative to the reference coordinate system {w}.

In the equation (8), the amount of orientation change $^wR_{wmS\text{-}wmT}$ of the orientation of the end of the operating arm relative to the reference coordinate system {w} may be determined based on the starting orientation $^wP_{wmS}$ of the end of the operating arm relative to the reference coordinate system {w} and the target orientation $^wR_{wmT}$ of the end of the operating arm relative to the reference coordinate system {w}. The amount of orientation change $^wR_{H(t0)\text{-}H}$ of the master manipulator relative to the reference coordinate system {w} may be determined based on the previous orientation $^wR_{H(t0)}$ of the handle (such as, at time t0) relative to the reference coordinate system {w} and the current orientation $^{w}R_H$ of the handle (such as, at time t1) relative to the reference coordinate system {w}. See equation (9) for details, $$^{w}R_{wmT}(^{w}R_{wmS})^T = {}^{w}R_H(^{w}R_{H(t0)})^T \quad (9)$$

In some embodiments, by multiplying the left and right sides of equation (9) by the same matrix $^{Tb}R_w(^{Tb}R_w)^T$ respectively, an equation (10) is obtained based on the equation (9), $$^{Tb}R_w{}^{w}R_{wmT}(^{w}R_{wmS})^T(^{Tb}R_w)^T = {}^{Tb}R_w{}^{w}R_H(^{w}R_{H(t0)})^T \\ (^{Tb}R_w)^T \quad (10)$$

An equation (11) is obtained based on the left side of equation (10), $$^{Tb}R_w{}^{w}R_{wmT}(^{w}R_{wmS})^T(^{Tb}R_w)^T = (^{Tb}R_w{}^{w}R_{wmT}) \\ (^{Tb}R_w{}^{w}R_{wmS})^T = {}^{Tb}R_{wmT}(^{Tb}R_{wmS})^T \quad (11)$$

An equation (12) is obtained based on the right side of the equation (10), $$^{Tb}R_w{}^{w}R_H(^{w}R_{H(t0)})^T(^{Tb}R_w)^T = {}^{Tb}R_H(^{Tb}R_{H(t0)})^T = \\ (^{Tb}R_{CombX}{}^{CombX}R_H)(^{Tb}R_{CombX}{}^{CombX}R_{H(t0)})^T \quad (12)$$

Combining with the equations (8) to (12), an expression for the target orientation $^{Tb}R_{wmT}$ of the end of the operating arm during the remote operation may be obtained, as shown in equation (13), $$^{Tb}R_{wmT} = {}^{Tb}R_{CombX}(^{CombX}R_H \\ (^{CombX}R_{H(t0)})^T)^{CombX}R_{Tb}{}^{Tb}R_{wmS} \quad (13)$$

Tb

Based on the equation (13), in some embodiments, the target orientation $^{Tb}R_{wmT}$ of the end of the operating arm relative to the operating arm base coordinate system {Tb} may be determined based on the previous orientation $^{CombX}R_{H(t0)}$ and the current orientation $^{CombX}R_H$ of the handle relative to the master manipulator base coordinate system {CombX}, the starting orientation $^{w}R_{wmS}$ of the end of the operating arm relative to the operating arm base coordinate system {Tb}, and the transformation relationship $^{CombX}R_{Tb}$ between the operating arm base coordinate system {Tb} and the master manipulator base coordinate system {CombX}.

In some embodiments, the transformation relationship $^{CombX}R_{Tb}$ between the operating arm base coordinate system {Tb} and the master manipulator base coordinate system {CombX} may be determined based on the transformation relationship $^{CombX}R_{Tb}$ between the operating arm base coordinate system {Tb} and the camera coordinate system {lens}, the transformation relationship $^{Screen}R_{lens}$ between the camera coordinate system {lens} and the display coordinate system {Screen}, and the transformation relationship $^{CombX}R_{Screen}$ between the display coordinate system {Screen} and the master manipulator base coordinate system {CombX}.

In some embodiments, the transformation relationship between the master manipulator and the display may be predetermined. For example, the master manipulator and the display may be fixed on the master control trolley respectively, and the display coordinate system {Screen} and the master manipulator base coordinate system {CombX} have a predetermined transformation relationship. In some embodiments, the operating arm base coordinate system {Tb} and the camera coordinate system {lens} have a predetermined transformation relationship. In some embodiments, the camera may be disposed at the end of a vision tool. Before the operator performs the operation, the vision tool has finished moving, and the transformation relationship $^{lens}R_{Tb}$ between the operating arm base coordinate system {Tb} and the camera coordinate system {lens} will no longer change.

In some embodiments, the display coordinate system {Screen} and the camera coordinate system {lens} are consistent in the definition for the direction of the field of view. Therefore, the amount of position change of an image of the end of the operating arm in the display relative to the display coordinate system {Screen} is consistent with the amount of position change of the end of the operating arm relative to the camera coordinate system {lens}. In this way, when the operator holds the handle of the master manipulator to operate, the pose change of the image of the effector of the end of the operating arm perceived by the operator and the pose change of the handle of the master manipulator perceived by the operator maintain a preset transformation relationship.

In some embodiments, the target pose of the end of the operating arm relative to the reference coordinate system {w} may be determined based on the target pose of the end of the operating arm relative to the operating arm base coordinate system {Tb} and the transformation relationship $^{w}R_{Tb}$ between the operating arm base coordinate system {Tb} and the reference coordinate system {w}. In some embodiments, the operating arm base coordinate system {Tb} and the reference coordinate system {w} have a predetermined transformation relationship. The detail is shown in the equation (14), $$^{w}P_{mwT} = {}^{w}R_{Tb} \cdot {}^{Tb}P_{mwT}$$

$$_{w}R_{wmT} = {}^{Tb}R_{Tb} \cdot {}^{Tb}R_{wmT} \quad (14)$$

Those skilled in the art could understand that the operating arm base coordinate system {Tb} may be used as the reference coordinate system {w}.

In some embodiments, a plurality of pose identifications are distributed on the operating arm (e.g., on the operating arm end 231). In some embodiments, the plurality of pose identifications are provided on an outer surface of a columnar portion of the operating arm 230. For example, the plurality of pose identifications are distributed circumferentially on the operating arm end 231, such as arranged circumferentially on an outer surface of a columnar portion of the operating arm end 231. In some embodiments, the outer surface of the columnar portion of the operating arm end 231 is provided with a positioning label 232 comprising the plurality of pose identifications. The plurality of pose identifications include a plurality of different pose identification patterns distributed on the positioning label along the circumference of the columnar portion and pose identification pattern corners in the pose identification patterns.

In some embodiments, the pose identification may include a pose identification pattern and a pose identification pattern corner in the pose identification pattern. In some embodiments, the pose identification pattern may be disposed on a label on the operating arm end, or may be printed on the operating arm end, or may be a pattern formed by the physical structure of the operating arm end itself, for example, may include a depression or a bump and a combination thereof. In some embodiments, the pose identification pattern may include a pattern formed by brightness, grayscale, color, etc. In some embodiments, the pose identification pattern may include a pattern actively (e.g., self-emitting) or passively (e.g., reflecting lights) providing information to be detected by the image acquisition device. Those skilled in the art may understand that, in some embodiments, a pose of the pose identification or a pose of the pose identification pattern may be represented by a pose of a pose identification pattern corner coordinate system. In some embodiments, the pose identification pattern is provided in an area on the operating arm end suitable for the image acquisition device to acquire an image, for example, an area that may be covered by the field of view of the image acquisition device during the operation or an area that is not easily disturbed or obscured during the operation.

FIG. 6 shows a schematic diagram of a label 600 comprising a plurality of pose identifications according to some embodiments. FIG. 7 shows a schematic diagram of a label 700 disposed on the circumference of the operating arm end and forming a cylindrical shape. It may be understood that for simplicity, the label 600 may include the same pose identification pattern as the label 700.

Referring to FIG. 6, the plurality of pose identifications may include a plurality of different pose identification patterns 610. The plurality of pose identifications may also include a plurality of pose identification pattern corners $P_6$ in a plurality of different pose identification patterns 610. In the present disclosure, the pose identification pattern corner is represented by a symbol of "○". In some embodiments, the pose identification may be determined by recognizing the pose identification pattern 610 or the pose identification pattern corner $P_6$ therein.

Referring to FIG. 7, in a state of circumferential arrangement, the label 600 becomes a label 700 whose spatial structure is cylindrical. In some embodiments, an around-axis angle or a roll angle of the pose identification may be represented by an around-axis angle of the angle identification pattern or the pose identification pattern corner. The around-axis angle of each angle identification pattern or the pose identification pattern corner is known or predetermined. In some embodiments, based on a distribution of the plurality of pose identifications (e.g., the pose identification patterns or the pose identification pattern corners), the around-axis angle identified by each pose identification may be determined. In some embodiments, the plurality of pose identifications may be uniformly distributed (e.g., the pose identification pattern corners in the label 600 are distributed at an equal spacing, the pose identification pattern corners in the label 700 are distributed at an equal distribution angle). In other embodiments, the plurality of pose identifications may be non-uniformly distributed. In some embodiments, based on the distribution of the plurality of pose identifications, each pose identification pattern may be used to identify a specific around-axis angle, and each pose identification pattern has a one-to-one correspondence relationship with the identified around-axis angle. In the present disclosure, the around-axis angle or the roll angle refers to an angle around the Z-axis (e.g., the Z-axis of the end coordinate system {wm} of the operating arm). In some embodiments, the Z-axis may be a tangent direction along the operating arm end.

As shown in FIG. 7, the plurality of different pose identification patterns 710 in the label 700 are uniformly distributed along the circumference of the cylindrical structure, and the plurality of pose identification pattern corners are uniformly distributed on a cross-sectional circle 720 of the XY plane of the end coordinate system {wm} of the operating arm, then a distribution angle (e.g., angle $\alpha_0$) of any adjacent pose identification pattern corners is equal. Assuming that the X-axis points towards the pose identification pattern corner $P_7$, and $P_7$ is used as a reference corner for identifying an around-axis angle of 0° (the pose identification pattern where the pose identification pattern corner $P_7$ is located is used as a reference pattern), then an around-axis angle identified by any pose identification pattern corner may be determined according to a position relationship between this pose identification pattern corner and the pose identification pattern corner $P_7$. In some embodiments, the around-axis angle identified by the pose identification pattern corner may be determined based on the following equation (15):

$$\alpha_m = \alpha_0(m-1) \qquad (15)$$

wherein, $\alpha_m$ is an around-axis angle of the $m^{th}$ pose identification pattern corner in a clockwise direction of the cross-sectional circle 720, with the pose identification pattern corner $P_7$ as a first pose identification pattern corner.

Referring to FIG. 3, at step 303, a positioning image is acquired. In some embodiments, the positioning image comprises a plurality of pose identifications on the end of the operating arm. In some embodiments, the positioning image may be received from the image acquisition device 250 as shown in FIG. 2. For example, the control device 220 may receive the positioning image sent actively by the image acquisition device 250. Alternatively, the control device 220 may send an image request instruction to the image acquisition device 250, and the image acquisition device 250 sends the positioning image to the control device 220 in response to the image request instruction.

Continuing to refer to FIG. 3, at step 305, the plurality of pose identifications located on the end of the operating arm are recognized in the positioning image and the plurality of pose identifications include different pose pattern patterns. For example, an exemplary method for recognizing the plurality of pose identifications located at the end of the operating arm may include methods as shown in FIGS. 10, 12 and 14-15. In some embodiments, the control device 220 may recognize some or all of the pose identifications in the positioning image by an image processing algorithm. In some embodiments, the image processing algorithm may include a feature recognition algorithm, and the image processing algorithm may extract or recognize features of the pose identification. For example, the image processing algorithm may include a corner detection algorithm for detecting the pose identification pattern corners. The corner detection algorithm may include, but not limited to, one of grayscale map based corner detection, binary image based corner detection, and contour curve based corner detection. For example, the image processing algorithm may be a color feature extraction algorithm for detecting color features in the pose identification pattern. As another example, the image processing algorithm may include a contour detection algorithm for detecting contour features of the pose identification pattern. In some embodiments, the control device may recognize some or all of the pose identifications in the positioning image by recognition models.

Continuing to refer to FIG. 3, at step 307, the actual pose of the end of the operating arm is determined based on the plurality of pose identifications. In some embodiments, the method 300 further comprises: determining two-dimensional coordinates of the plurality of pose identifications in the positioning image; and based on the two-dimensional coordinates of the plurality of pose identifications in the positioning image and three-dimensional coordinates of the plurality of pose identifications relative to an end coordinate system of the operating arm, determining a pose of the end coordinate system of the operating arm relative to the reference coordinate system, as the actual pose of the end of the operating arm. In some embodiments, a coordinate of the pose identification may be represented by a coordinate of the pose identification pattern corner. For example, a two-dimensional coordinate of the pose identification in the positioning image and a three-dimensional coordinate of the pose identification in the end coordinate system of the operating arm may be represented by a coordinate of the pose identification pattern corner. In some embodiments, the pose of the end coordinate system of the operating arm relative to the reference coordinate system may be determined as the actual pose of the end of the operating arm, based on the two-dimensional coordinates of the plurality of pose identification pattern corners in the positioning image and the three-dimensional coordinates of the plurality of pose identification pattern corners in the end coordinate system of the operating arm.

In some embodiments, the method 300 may further comprises: determining the pose of the end coordinate system of the operating arm relative to the reference coordinate system based on the two-dimensional coordinates of the plurality of pose identification pattern corners in the positioning image, the three-dimensional coordinates of the plurality of pose identification pattern corners in the end coordinate system of the operating arm and the transformation relationship of the camera coordinate system relative to the reference coordinate system. In some embodiments, the transformation relationship of the camera coordinate system relative to the reference coordinate system may be known. For example, the reference coordinate system is a world coordinate system, and the transformation relationship of the camera coordinate system relative to the world coordinate system may be determined based on the pose in which the camera is placed. In other embodiments, according to actual needs, the reference coordinate system may also be the camera coordinate system itself. In some embodiments, based on a camera imaging principle and a projection model, the pose of the end coordinate system of the operating arm relative to the camera coordinate system is determined based on the two-dimensional coordinates of the plurality of pose identification pattern corners in the positioning image and the three-dimensional coordinates of the plurality of pose identification pattern corners in the end coordinate system of the operating arm. The pose of the end coordinate system of the operating arm relative to the reference coordinate system may be obtained based on the pose of the end coordinate system of the operating arm relative to the camera coordinate system and the transformation relationship of the camera coordinate system relative to the reference coordinate system. In some embodiments, the intrinsic parameter of the camera may also be considered. For example, the intrinsic parameter of the camera may be the camera intrinsic parameter of the image acquisition device 250 as shown in FIG. 2. The intrinsic parameter of the camera may be known or obtained by calibration. In some embodiments, the camera coordinate system may be understood as a coordinate system established at a camera origin. For example, the camera coordinate system may be a coordinate system established with the optical center of the camera as the origin or a coordinate system established with the center of lens of the camera as the origin. When the camera is a binocular camera, the origin of the camera coordinate system may be the center of the left lens of the camera, or the center of the right lens, or any point on a line connecting the centers of the left and right lenses (such as the midpoint of the line).

In some embodiments, the pose of the end coordinate system {wm} of the operating arm relative to the reference coordinate system (e.g., the world coordinate system) {w} may be determined based on the following equation (16):

$$^{w}R_{wm} = {}^{w}R_{lens} {}^{lens}R_{wm}$$
$$^{w}P_{wm} = {}^{w}R_{lens}({}^{lens}R_{wm} + {}^{lens}P_{wm}) + {}^{w}P_{lens} \quad (16)$$

wherein, $^{w}R_{wm}$ is the orientation of the end coordinate system of the operating arm relative to the reference coordinate system, $^{w}P_{wm}$ is the position of the end coordinate system of the operating arm relative to the reference coordinate system, $^{w}R_{lens}$ is the orientation of the camera coordinate system relative to the reference coordinate system, $^{w}P_{lens}$ is the position of the camera coordinate system relative to the reference coordinate system, $^{lens}R_{wm}$ is the orientation of the end coordinate system of the operating arm relative to the camera coordinate system, and $^{lens}P_{wm}$ is the position of the end coordinate system of the operating arm relative to the camera coordinate system.

Some embodiments of the present disclosure provide a method for determining the three-dimensional coordinates of the plurality of pose identifications relative to the end coordinate system of the operating arm. In some embodiments, the three-dimensional coordinates of the plurality of pose identifications relative to the end coordinate system of the operating arm are determined based on a distribution of the plurality of pose identifications. For example, the three-dimensional coordinates of the plurality of pose identification pattern corners in the end coordinate system of the operating arm are determined based on the distribution of the plurality of pose identification pattern points.

FIG. 8 shows a flowchart of a method 800 for determining three-dimensional coordinates of a plurality of pose identifications relative to an end coordinate system of the operating arm according to some embodiments of the present disclosure. As shown in FIG. 8, some or all of the steps in the method 800 may be performed by a control device (e.g., the control device 120 as shown in FIG. 1, the control device 220 as shown in FIG. 2 or the control device 1720 as shown in FIG. 17). Some or all of the steps in the method 800 may be implemented by software, firmware, and/or hardware. In some embodiments, the method 800 may be performed by a robot system (e.g., a robot system 100 as shown in FIG. 1, or a robot system 1700 as shown in FIG. 17). In some embodiments, the method 800 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium.

Referring to FIG. 8, at step 801, around-axis angles of a plurality of pose identifications relative to the Z-axis of the end coordinate system of the operating arm are determined based on a distribution of the plurality of pose identifications. In some embodiments, the around-axis angles of the plurality of pose identifications relative to the Z-axis of the end coordinate system of the operating arm are determined based on a plurality of pose identification patterns. For example, each pose identification pattern may identify a specific around-axis angle, and a different pose identification pattern corresponds to the identified around-axis angle in a one-to-one way. The around-axis angle identified by the recognized pose identification pattern may be determined based on the recognition of the pose identification pattern and the correspondence relationship between the pose identification pattern and the around-axis angle. It should be understood that a distribution of each pose identification pattern is known or predetermined. In some embodiments, distributions of a plurality of pose identification patterns or a plurality of pose identification pattern corners may be distributions as shown in FIG. 6. In some embodiments, the around-axis angle identified by each pose identification pattern corner may also be determined based on the equation (15).

Referring to FIG. 8, at step 803, the three-dimensional coordinates of the plurality of pose identifications relative to the end coordinate system of the operating arm are determined based on the around-axis angles of the plurality of pose identifications. In some embodiments, as shown in FIG. 7, each pose identification pattern corner is located on the circumference of the cross-sectional circle 720. The circle center and the radius r of the cross-sectional circle 720 are known. With the pose identification pattern corner $P_7$ as a reference corner, the three-dimensional coordinate of the pose identification pattern corner $P_7$ in the end coordinate system {wm} of the operating arm is (r,0,0). In some embodiments, the three-dimensional coordinate of each pose identification pattern corner in the end coordinate system {wm} of the operating arm may be determined based on the following equation (17):

$$C_m = [r\cos \alpha_m, r\sin \alpha_m, 0]^T \qquad (17)$$

wherein, $C_m$ is a three-dimensional coordinate of the $m^{th}$ pose identification pattern corner, with the pose identification pattern corner $P_7$ taken as a first pose identification pattern corner and in a clockwise direction of the cross-sectional circle 720, in the end coordinate system {wm} of the operating arm.

In some embodiments, the around-axis angle $\alpha_m$ identified by the $m^{th}$ pose identification pattern corner is determined based on the equation (15), and then the three-dimensional coordinate $C_m$ is determined based on the equation (17) and the around-axis angle $\alpha_m$ determined by the equation (15).

FIG. 9 shows a flowchart of a method 900 for determining three-dimensional coordinates of a plurality of pose identifications relative to an end coordinate system of the operating arm according to other embodiments of the present disclosure. The method 900 may be an alternative embodiment of the method 800 as shown in FIG. 8. As shown in FIG. 9, some or all of the steps in the method 900 may be performed by a control device (e.g., a control device 120 as shown in FIG. 1, a control device 220 as shown in FIG. 2 or a control device 1720 as shown in FIG. 17). Some or all of the steps in the method 900 may be implemented by software, firmware, and/or hardware. In some embodiments, the method 900 may be performed by a robot system (e.g., a robot system 100 as shown in FIG. 1, or a robot system 1700 as shown in FIG. 17). In some embodiments, the method 900 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium.

Referring to FIG. 9, at step 901, an arrangement order of the plurality of pose identifications is determined based on at least two of the plurality of pose identifications. In some embodiments, the arrangement order of the plurality of pose identifications may be represented by an arrangement order of the plurality of pose identification patterns. In some embodiments, the arrangement order of the plurality of pose identifications is determined by recognizing any two pose identification patterns. It should be understood that the plurality of pose identifications comprise different pose identification patterns, and in the case where any two pose identification patterns are known, the arrangement order (such as a clockwise arrangement or a counterclockwise arrangement) of the plurality of pose identifications in the positioning image may be determined based on a known distribution of the plurality of pose identification patterns (such as, a distribution of different pose identification patterns in the label 600 shown in FIG. 6, or a distribution of different pose identification patterns in the label 700 shown in FIG. 7).

Referring to FIG. 9, at step 903, the three-dimensional coordinates of the plurality of pose identifications relative to the end coordinate system of the operating arm are determined based on the arrangement order of the plurality of pose identifications. In some embodiments, the three-dimensional coordinate of each pose identification in the end coordinate system of the operating arm may be determined based on a known distribution of the plurality of pose identifications, the three-dimensional coordinate of each pose identification may be represented by a three-dimensional coordinate of the pose identification pattern corner in the end coordinate system of the operating arm, and each pose identification pattern corresponds to one coordinate point in the end coordinate system of the operating arm. After determining the arrangement order of the plurality of pose identification patterns, the remaining pose identification patterns may be determined based on the recognized pose identification patterns, and then the three-dimensional coordinate of each pose identification pattern in the end coordinate system of the operating arm may be determined. In some embodiments, the plurality of pose identification corners in the positioning image is recognized, and pose identification patterns corresponding to any two of the plurality of pose identification corners are determined. The arrangement order of the plurality of pose identification pattern corners is determined based on the two recognized pose identification patterns, and then the three-dimensional coordinate of each pose identification pattern corner in the end coordinate system of the operating arm may be determined. In addition, a distribution of all pose identification patterns may be determined based on the arrangement order, so that the pose identification pattern at the corresponding position on the positioning image is matched with a specific pose pattern matching template, which improves the data processing speed. In some embodiments, a matching between the pose pattern matching template and the pattern at the pose identification pattern corner may be similarly implemented as a step 1003 in a method 1000.

Figure 10:
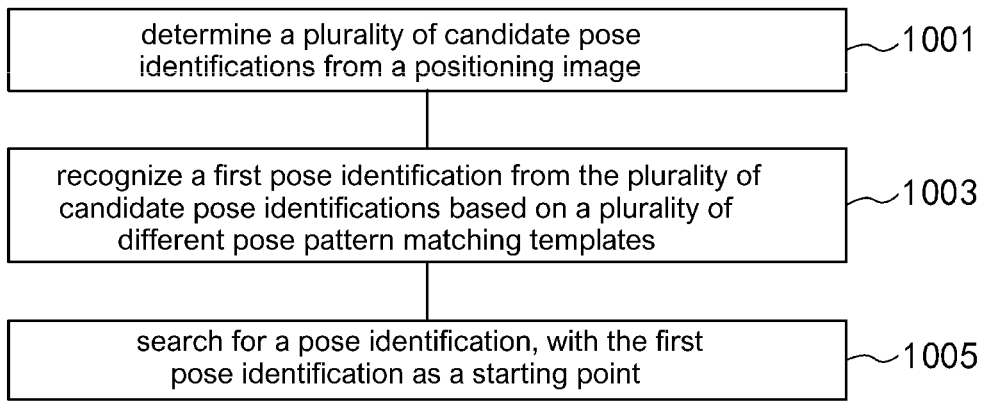
FIG. 10 shows a flowchart of a method for recognizing a pose identification according to some embodiments of the present disclosure.

Some embodiments of the present disclosure provide a method for recognizing a pose identification. FIG. 10 shows a flowchart of a method 1000 of recognizing a pose identification according to some embodiments of the present disclosure. As shown in FIG. 10, some or all of the steps in the method 1000 may be performed by a control device (e.g., the control device 120 as shown in FIG. 1, the control device 220 as shown in FIG. 2 or the control device 1720 as shown in FIG. 17). Some or all of the steps in the method 1000 may be implemented by software, firmware, and/or hardware. In some embodiments, the method 1000 may be performed by a robot system (e.g., a robot system 100 as shown in FIG. 1, or a robot system 1700 as shown in FIG. 17). In some embodiments, the method 1000 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium.

Referring to FIG. 10, at step 1001, a plurality of candidate pose identifications are determined from the positioning image. In some embodiments, the pose identification may include a pose identification pattern corner in a pose identification pattern. A coordinate of the candidate pose identification or a coordinate system origin may be represented by the candidate pose identification pattern corner. In some embodiments, the candidate pose identification pattern corner may refer to a possible pose identification pattern corner obtained after preliminarily processing or preliminarily recognizing the positioning image.

In some embodiments, the method 1000 may also include determining a Region of Interest (ROI) in the positioning image. For example, the ROI may be cut out from the positioning image and the plurality of candidate pose identifications may be determined from the ROI. The ROI may be a full image or a partial area of the positioning image. For example, the ROI of a current frame may be cut out based on an area within a certain range of a plurality of pose identification pattern corners determined by a previous frame of image (for example, the positioning image of a previous image processing cycle). For a non-first-frame positioning image, the ROI may be an area within a certain distance range centered on imaginary points formed by coordinates of the plurality of pose identification pattern corners of the previous image processing cycle. The certain distance range may be a fixed multiple of the average interval distance between the pose identification pattern corners, such as twice. It should be understood that a predetermined multiple may also be a variable multiple of the average interval distance between the plurality of candidate pose identification pattern corners in the previous image processing cycle.

In some embodiments, the method 1000 may further comprise: determining corner likelihood (CL) values of individual pixels in the positioning image. In some embodiments, the corner likelihood value of the pixel may be a numerical value that characterizes a likelihood of the pixel being a feature point (e.g., a corner). In some embodiments, the positioning image may be preprocessed before calculating the corner likelihood value of each pixel, and then the corner likelihood value of each pixel in the preprocessed image is determined. The preprocessing of the image may include, for example, at least one of image graying, image denoising and image enhancement. For example, the image preprocessing may include cutting out the ROI from the positioning image and converting the ROI into a corresponding grayscale image.

In some embodiments, the way to determine the corner likelihood value of each pixel in the ROI may include, for example, performing a convolution operation on each pixel in the ROI range to obtain first and/or second derivatives of each pixel. The first and/or second derivatives of each pixel in the ROI range are used to solve for the corner likelihood value of each pixel. For example, the corner likelihood values of pixels may be determined based on the following equation (18):

$$CL = \max(c_{xy}, c_{45})$$

$$c_{xy} = \tau^2 \cdot |I_{xy}| - 1.5 \cdot \tau \cdot (|I_{45}| + |I_{n45}|)$$

$$c_{45} = \tau^2 \cdot |I_{45\_45}| - 1.5 \cdot \tau \cdot (|I_x| + |I_y|) \qquad (18)$$

wherein, $\tau$ is a set constant, for example, which is set to 2; $I_x$, $I_{45}$, $I_y$, $I_{n45}$ are the first derivatives of the pixel in the four directions of $0$, $\pi/4$, $\pi/2$, $-\pi/4$, respectively; $I_{xy}$ and $I_{45\_45}$ are the second derivatives of the pixel in the directions of $0$, $\pi/2$ and $\pi/4$, $-\pi/4$, respectively.

In some embodiments, the method 1000 may further include dividing the ROI into a plurality of subregions. For example, a non-maximal suppression method may be used to equally segment one ROI range into a plurality of sub-images. In some embodiments, the ROI may be equally segmented into the plurality of sub-images of 5×5 pixels. The above embodiments are for an exemplary purpose, but not for a limiting purpose, and it should be understood that the positioning image or the ROI may also be segmented into a plurality of sub-images of other sizes, for example, segmented into a plurality of sub-images of 9×9 pixels.

In some embodiments, the method 1600 may further include determining a pixel with the largest corner likelihood value in each subregion to form a set of pixels. In some embodiments, the set of pixels is used as a plurality of candidate identifications determined from the positioning image. For example, a pixel with the largest CL value in each sub-image may be determined and compared with a first threshold. A set of pixels with CL values greater than the first threshold is determined. In some embodiments, the first threshold may be set to 0.06. It should be understood that the first threshold may also be set to other values.

Referring to FIG. 10, at step 1003, a first pose identification is recognized from the plurality of candidate pose identifications based on a plurality of different pose pattern matching templates. In some embodiments, the plurality of different pose pattern matching templates are respectively matched with the pattern at the candidate pose identification pattern corner to recognize the first pose identification. For example, the candidate pose identification pattern corner that meets a preset pose pattern matching degree criterion is determined as the first pose identification pattern corner. In some embodiments, the pose pattern matching template has the same or similar features as a pattern of an area near the pose identification pattern corner. If a matching degree between the pose pattern matching template and the pattern of the area near the candidate pose identification pattern corner reaches the preset pose pattern matching degree criterion (for example, the matching degree is higher than a threshold), the pattern of the area near the candidate pose identification pattern corner may be considered to have the same or similar features as the pose pattern matching template, and then the current candidate pose identification pattern corner may be considered to be the pose identification pattern corner.

In some embodiments, the pixel with the largest CL value in the set of pixels is determined, as a candidate pose identification pattern corner. For example, all the pixels in the set of pixels may be ordered in an order of largest to smallest CL values, and the pixel with the largest CL value is treated as the candidate pose identification pattern corner. In some embodiments, after determining the candidate pose identification pattern corner, the pose pattern matching template is matched with a pattern at the candidate pose identification pattern corner, and if the preset pose pattern matching degree criterion is reached, the candidate pose identification pattern corner is determined to be the recognized first pose identification pattern corner.

In some embodiments, the method 1000 may also include: in response to the matching failing, determining a pixel with the largest corner likelihood value of the remaining pixels in the set of pixels as the candidate pose identification pattern corner. For example, if the candidate pose identification pattern corner does not reach the preset matching degree criterion, a pixel with a secondary CL value (a pixel with the second largest CL value) is selected as the candidate pose identification pattern corner, the pose pattern matching template is matched with an pattern at this candidate pose identification pattern corner, and so on until the first pose identification pattern corner is recognized.

In some embodiments, the pose identification pattern may be a pattern chequered with black and white (such as a checkerboard pattern), so the pose pattern matching template may be the same pattern. A correlation Coefficient (CC) between a grayscale distribution $G_M$ of the pose pattern matching template and a pixel neighborhood grayscale distribution $G_{image}$ of the pixel corresponding to the candidate pose identification pattern corner is used for matching. The pixel neighborhood grayscale distribution $G_{image}$ of the pixel is a grayscale distribution of pixels that are within a certain range (for example, 10×10 pixels) centered on that pixel. The correlation coefficient may be determined based on the following equation (19):

$$CC = \frac{\text{Cov}(G_{image}, G_M)}{\text{Var}(G_{image}) \cdot \text{Var}(G_M)} \quad (19)$$

wherein, Var( ) is a variance function and Cov( ) is a covariance function. In some embodiments, when the correlation coefficient is less than 0.8, the grayscale distribution within the pixel neighborhood has a low correlation with the pose pattern matching template, then it is determined that the candidate pose identification pattern corner with the largest corner likelihood value is not the pose identification pattern corner, otherwise it is considered that the candidate pose identification pattern corner with the largest corner likelihood value is the pose identification pattern corner.

Figure 11:
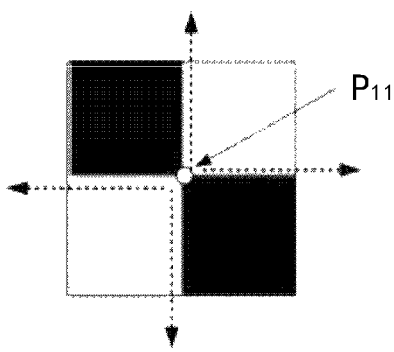
FIG. 11 shows a schematic diagram of a pose identification pattern according to some embodiments of the present disclosure.

In some embodiments, the method 1000 may further comprise: determining an edge direction of the candidate pose identification pattern corner. For example, as shown in FIG. 11, the candidate pose identification pattern corner is the corner $P_{11}$ in the pose identification pattern 1100, and the edge direction of the corner Pu may refer to a direction of an edge forming the corner $P_{11}$, such as directions indicated by the dotted arrows in FIG. 11.

In some embodiments, the edge direction may be determined by first derivatives ($I_x$ and $I_y$) of each pixel, which is in a neighborhood with a certain range (e.g., 10×10 pixels) centered on the candidate pose identification pattern corner, in the X direction and Y direction of the plane coordinate system. For example, the edge direction may be calculated based on the following equation (20):

$$I_{angle} = \arctan(I_y/I_x), I_{weight} = \sqrt{I_x^2 + I_y^2} \quad (20)$$

wherein, the first derivatives ($I_x$ and $I_y$) may be obtained by performing a convolution operation on each pixel within a neighborhood with a certain range. In some embodiments, the edge direction of the pixel may be obtained by performing a clustering calculation on the edge direction $I_{angle}$ of the pixel within each neighborhood with a range and a corresponding weight $I_{weight}$, and a $I_{weight}$ corresponding to a cluster with the largest proportion for the weight $I_{angle}$ is selected as the edge direction. It should be noted that if there are a plurality of edge directions, $I_{angle}$ corresponding to a plurality of clusters with the largest proportion for the weight $I_{weight}$ are selected as the edge directions.

In some embodiments, the method used for the clustering calculation may be any of K-means method, BIRCH (Balanced Iterative Reducing and Clustering using Hierarchies) method, DBSCAN (Density-Based Spatial Clustering of Applications with Noise) method, GMM (Gaussian Mixed Model) method.

In some embodiments, the method 1000 may further comprise: rotating the pose pattern matching template based on the edge direction. Rotating the pose pattern matching template according to the edge direction may align the pose pattern matching template with the image at the candidate pose identification pattern corner. The edge orientation of the candidate pose identification pattern corner may be used to determine an arranged direction of the image at the candidate identification pattern corner in the positioning image. In some embodiments, rotating the pose pattern matching template according to the edge direction may adjust the pose pattern matching template to the same direction or approximately the same direction as the image at the candidate pose identification pattern corner, for facilitating an image matching.

Figure 12:
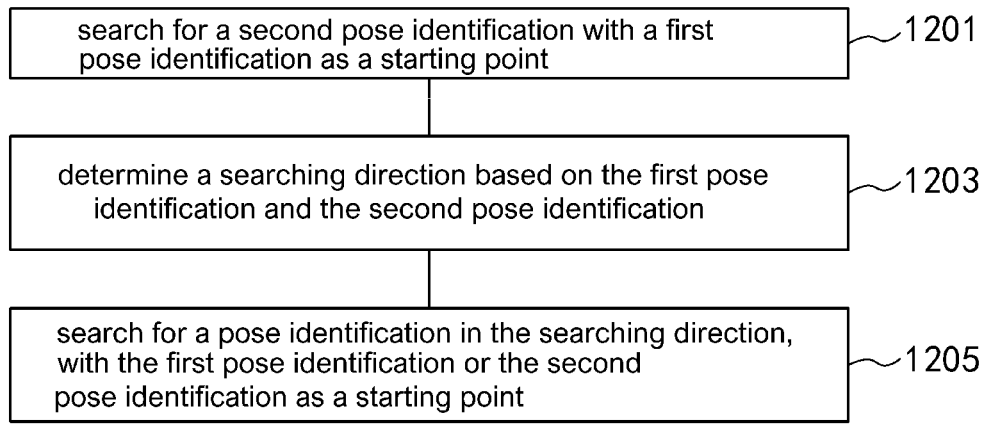
FIG. 12 shows a flowchart of a method for searching for the pose identification according to some embodiments of the present disclosure.

Referring to FIG. 10, at step 1005, a pose identification is searched for, with the first pose identification as a starting point. FIG. 12 shows a flowchart of a method 1200 for searching for the pose identification according to some embodiments of the present disclosure. As shown in FIG. 12, some or all of the steps in the method 1200 may be performed by a control device (e.g., the control device 120 as shown in FIG. 1, the control device 220 as shown in FIG. 2 or the control device 1720 as shown in FIG. 17). Some or all of the steps in the method 1200 may be implemented by software, firmware, and/or hardware. In some embodiments, the method 1200 may be performed by a robot system (e.g., a robot system 100 as shown in FIG. 1, or a robot system 1700 as shown in FIG. 17). In some embodiments, the method 1200 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium.

Referring to FIG. 12, at step 1201, a second pose identification is searched for, with the first pose identification as the starting point. In some embodiments, with the first pose identification pattern corner as the starting point, a second pose identification pattern corner is searched for in a set searching direction. In some embodiments, the set searching direction may comprise at least one of directly forward (corresponding to an angle direction of 0°), directly backward (corresponding to an angle direction of 120°), directly upward (an angle direction of 90°), directly downward (an angle direction of −90°) and oblique (such as an angle direction of ±45°) with respect to the first pose identifications pattern corner.

In some embodiments, the number of the set searching directions is n. For example, the searching is performed in 8 directions, and each searching direction $v_{sn}$ may be determined based on the following equation (21):

$$v_{sn} = [\cos(n \cdot \pi/4) \sin(n \cdot \pi/4)], (n=1,2,\ldots,8) \quad (21)$$

In some embodiments, the searching direction set in the current step may be determined according to a deviation angle between adjacent pose identification pattern corners in the plurality of pose identification pattern corners determined in a previous frame.

For example, a predetermined searching direction is determined based on the following equation (22):

$$\bar{\theta} = \left[\sum_{j=1}^{n_{last}-1} \text{atan2}(y_{j+1} - y_j, x_{j+1} - x_j)\right]/(n_{last} - 1) \quad (22)$$

-continued $$v_{s1} = [\cos(\overline{\theta})\ \sin(\overline{\theta})],$$

$$v_{s2} = -v_{s1}$$

wherein, $(x_j, y_1)$ is two-dimensional coordinates of the plurality of pose identification pattern corners determined for the previous frame (or a previous image processing cycle); $n_{last}$ is the number of the plurality of pose identification pattern corners determined for the previous frame; $v_{s1}$ is a first set searching direction; and $v_{s2}$ is a second set searching direction.

Figure 13:
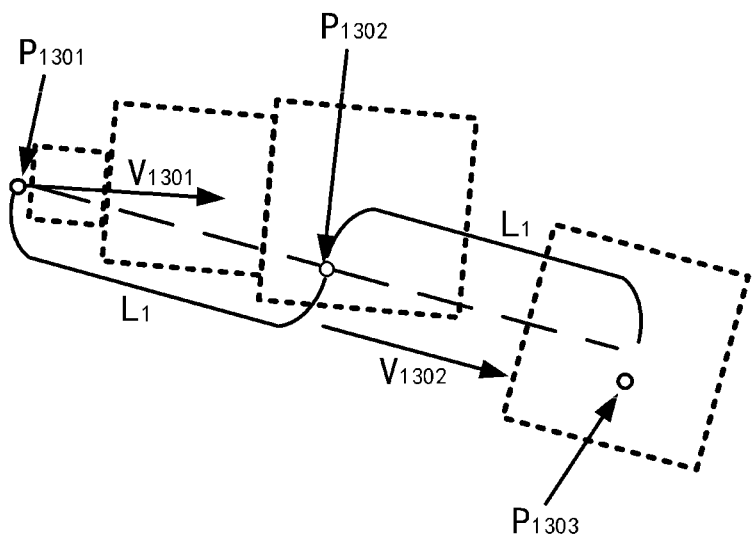
FIG. 13 shows a schematic diagram of searching for the pose identification according to some embodiments of the present disclosure.

In some embodiments, as shown in FIG. 13, searching for a coordinate position of the second pose identification pattern corner $P_{1302}$ in the set searching direction, with a coordinate position of the first pose identification pattern corner $P_{1301}$ as the starting point for searching, may specifically comprise: with the coordinate position of the first pose identification pattern corner $P_{1301}$ as the starting point for searching, searching for the pose identification pattern corner in the set searching direction $V_{1301}$ with a certain searching step size through a searching box (e.g., a dotted box in FIG. 13). If there is at least one candidate pose identification pattern corner in the searching box, a candidate pose identification pattern corner with the largest corner likelihood value in the searching box is preferentially selected to be the second pose identification pattern corner $P_{1302}$. In the case where the searching box is limited to a suitable size, when performing the searching for the second pose identification pattern corner $P_{1302}$ with the coordinate position of the first pose identification pattern corner $P_{1301}$ taken as the starting point for searching, the candidate pose identification pattern corner with the largest corner likelihood value among candidate pose identification pattern corners appearing in the searching box is more likely to be the pose identification pattern corner. Therefore, the candidate pose identification pattern corner with the largest corner likelihood value in the searching box may be considered as the second pose identification pattern corner $P_{1302}$, so as to improve a speed of the data processing. In other embodiments, in order to improve the accuracy of pose identification pattern corner recognition, the candidate pose identification pattern corner with the largest corner likelihood value among candidate pose identification pattern corners appearing in the searching box is selected for a corner recognition, to determine whether the candidate pose identification pattern corner with the largest corner likelihood value is the pose identification pattern corner. For example, the pose pattern matching template is matched with an image within a certain range around the candidate pose identification pattern corner with the largest corner likelihood value, and the candidate pose identification pattern corner that meets the preset pose pattern matching degree criterion may be regarded as the searched second pose identification pattern corner $P_{1302}$.

In some embodiments, continuing to refer to FIG. 13, the size of the searching box may be gradually increased, thereby gradually increasing a searching range. The searching step size may change synchronously with an edge length of the searching box. In other embodiments, the size of the searching box may also be a fixed size.

In some embodiments, the pose identification pattern may be a checkerboard pattern chequered with black and white, and pattern matching may be performed based on the correlation coefficient in the equation (19). If the correlation coefficient is greater than the threshold, the candidate pose identification pattern corner with the largest corner likelihood value is considered to be the pose identification pattern corner, and marked as the second pose identification pattern corner.

Figure 14:
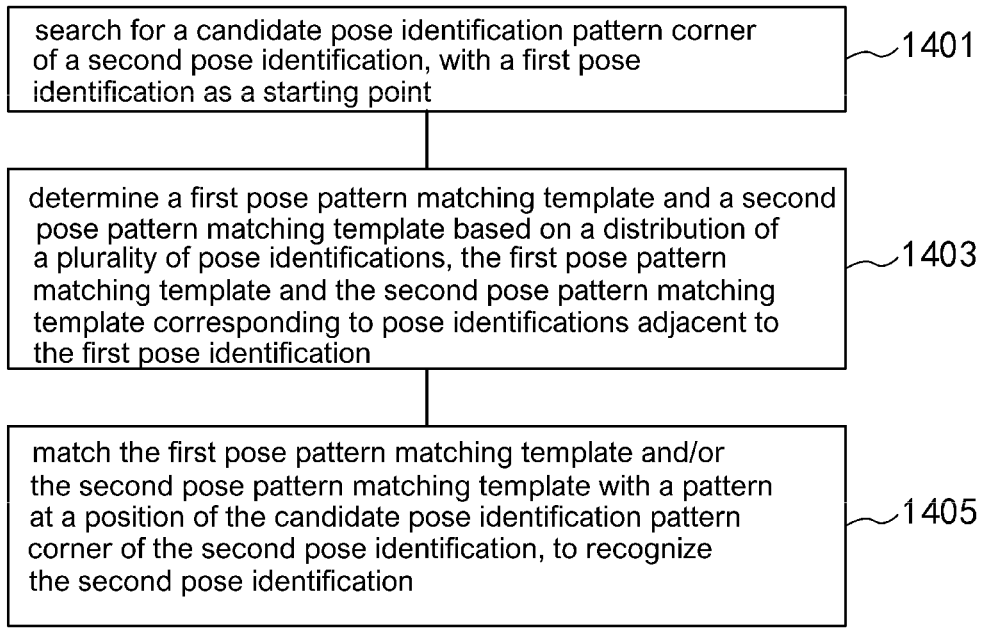
FIG. 14 shows a flowchart of a method for searching for a second pose identification according to some embodiments of the present disclosure.

FIG. 14 shows a flowchart of a method 1400 for searching for a second pose identification according to some embodiments of the present disclosure. As shown in FIG. 14, some or all of the steps in the method 1400 may be performed by a control device (e.g., the control device 120 as shown in FIG. 1, the control device 220 as shown in FIG. 2 or the control device 1720 as shown in FIG. 17). Some or all of the steps in the method 1400 may be implemented by software, firmware, and/or hardware. In some embodiments, the method 1400 may be performed by a robot system (e.g., a robot system 100 as shown in FIG. 1, or a robot system 1700 as shown in FIG. 17). In some embodiments, the method 1400 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium. In some embodiments, the step 1201 in the method 1200 may be similarly implemented as the method 1400.

Referring to FIG. 14, at step 1401, a candidate pose identification pattern corner of the second pose identification is searched for, with the first pose identification as the starting point. In some embodiments, searching for the candidate pose identification pattern corner of the second pose identification may be similarly implemented as the searching for the second pose identification pattern corner $P_{1302}$ as shown in FIG. 13.

At step 1403, a first pose pattern matching template and a second pose pattern matching template are determined based on a distribution of the plurality of pose identifications. The first pose pattern matching template and the second pose pattern matching template correspond to a pose identification adjacent to the first pose identification. In some embodiments, step 1403 may be performed before or after the step 1401, or step 1403 may also be performed synchronously with the step 1401. In some embodiments, a pose identification pattern included in a pose identification adjacent to the first pose identification may be determined based on a pose identification pattern included in the first pose identification and the distribution of the plurality of pose identification patterns, and then the first pose pattern matching template and the second pose pattern matching template may be determined.

At step 1405, the first pose pattern matching template and/or the second pose pattern matching template are matched with a pattern at a position of the candidate pose identification pattern corner of the second pose identification, to recognize the second pose identification. In some embodiments, the first pose pattern matching template and/or the second pose pattern matching template may be matched with the pattern at the position of the candidate pose identification pattern corner of the second pose identification based on the correlation coefficient in the equation (19). If the correlation coefficient is greater than a threshold, the candidate pose identification pattern corner of the second pose identification is determined as the pose identification pattern corner of the second pose identification, and a pattern corresponding to the pose pattern matching template (the first pose pattern matching template or the second pose pattern matching template) with a correlation coefficient greater than the threshold is determined to be the pose identification pattern of the second pose identification.

Referring to FIG. 12, at step 1203, the searching direction is determined based on the first pose identification and the second pose identification. In some embodiments, the searching direction comprises: a first searching direction and a second searching direction. The first searching direction may be a direction that starts from the coordinate position of the first pose identification pattern corner and is away from the second pose identification pattern corner. The second searching direction may be a direction that starts from the coordinate position of the second pose identification pattern corner and is away from the first pose identification pattern corner. For example, the searching direction $V_{1302}$ as shown in FIG. 13.

At step 1205, at step 1205, with the first pose identification or the second pose identification as a starting point, the pose identification is searched for in the searching direction. In some embodiments, if the first pose identification pattern corner is used as a new starting point, the first searching direction in the above embodiment may be used as a searching direction for the searching for the pose identification pattern corner. If the second pose identification pattern corner is used as a new starting point for searching, the second searching direction in the above embodiment may be used as a searching direction for the searching for the pose identification pattern corner. In some embodiments, searching for a new pose identification pattern corner (e.g., a third pose identification pattern corner $P_{1303}$ in FIG. 13) may be performed similarly as the step 1201 in the method 1200 or as the method 1500. In some embodiments, the searching step size may be a distance Li between the first pose identification pattern corner $P_{1301}$ and the second pose identification pattern corner $P_{1302}$.

Figure 15:
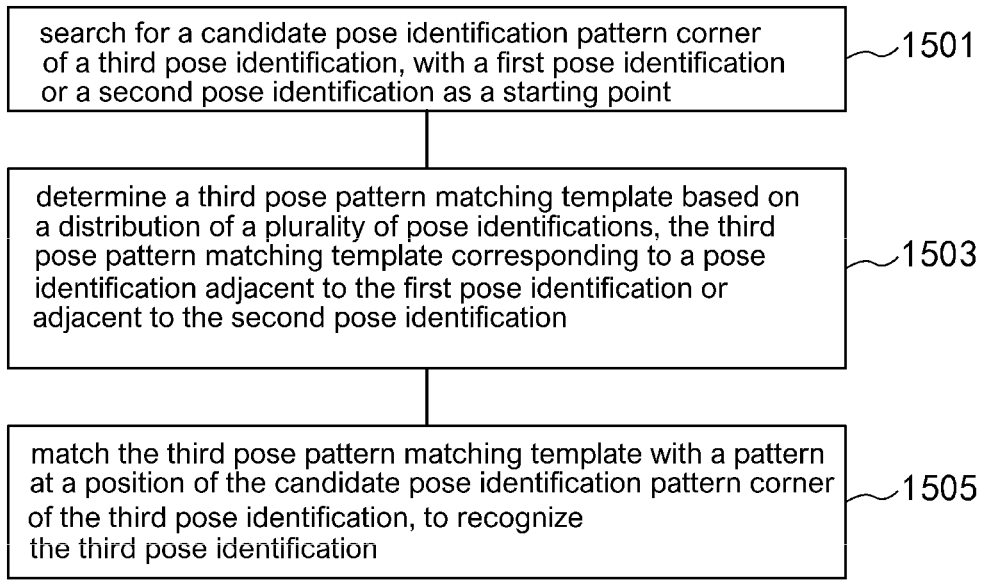
FIG. 15 shows a flowchart of a method for searching for the pose identification according to some embodiments of the present disclosure.

FIG. 15 shows a flowchart of a method 1500 for searching for the pose identification according to some embodiments of the present disclosure. As shown in FIG. 15, some or all of the steps in the method 1500 may be performed by a control device (e.g., the control device 120 as shown in FIG. 1, the control device 220 as shown in FIG. 2 or the control device 1720 as shown in FIG. 17). Some or all of the steps in the method 1500 may be implemented by software, firmware, and/or hardware. In some embodiments, the method 1500 may be performed by a robot system (e.g., a robot system 100 as shown in FIG. 1, or a robot system 1700 as shown in FIG. 17). In some embodiments, the method 1500 may be implemented as computer-readable instructions. These instructions may be read and performed by a general-purpose processor or a dedicated processor (e.g., a control device 1720 as shown in FIG. 17). In some embodiments, these instructions may be stored on a computer-readable medium. In some embodiments, the step 1205 in the method 1200 may be similarly implemented as the method 1500.

Referring to FIG. 15, at step 1501, a candidate pose identification pattern corner of a third pose identification is searched for, with the first pose identification or the second pose identification as the starting point. In some embodiments, searching for the candidate pose identification pattern corner of the third pose identification may be similarly implemented as searching for the third pose identification pattern corner $P_{1303}$ as shown in FIG. 13.

At step 1503, a third pose pattern matching template is determined based on the distribution of the plurality of pose identifications. The third pose pattern matching template corresponds to a pose identification adjacent to the first pose identification or adjacent to the second pose identification. In some embodiments, a pose identification pattern included in a pose identification adjacent to the first pose identification or the second pose identification may be determined based on a pose identification pattern included in the first pose identification or the second pose identification and the distribution of the plurality of pose identification patterns, and then the third pose pattern matching template is determined.

At step 1505, the third pose pattern matching template is matched with a pattern at a position of the candidate pose identification pattern corner of the third pose identification, to recognize the third pose identification. In some embodiments, the step 1505 may be similarly implemented as the step 1405.

In some embodiments, in response to a searching distance being greater than a searching distance threshold, a pixel with the largest corner likelihood value of the remaining pixels in the set of pixels is determined as a candidate pose identification pattern corner; and a plurality of different pose pattern matching templates are respectively matched with the pattern at the position of the candidate pose identification pattern corner, to recognize the first pose identification. In some embodiments, after determining the pixel with the largest corner likelihood value of the remaining pixels in the set of pixels as a new candidate pose identification pattern corner, a new first pose identification may be recognized based on a method similar to the step 1003. In some embodiments, the searching distance being greater than the searching distance threshold may be understood as the searching distance in part or all of the searching directions being greater than the searching distance threshold. In some embodiments, the searching distance threshold may include a set multiple of a distance between the N-lth pose identification pattern corner and the $N-2^{th}$ pose identification pattern corner, wherein N>3.

For example, the searching distance threshold is twice the distance between the previous two pose identification pattern corners. In this way, the maximum searching distance for searching for the third pose identification pattern corner is twice the distance between the first pose identification pattern corner and the second pose identification pattern corner. If the searching distance is reached in the searching direction and the pose identification pattern corner has not been searched, a pixel with the largest corner likelihood value of the remaining pixels in the set of pixels is determined as a new candidate pose identification pattern corner, and a new first pose identification is recognized, and the current searching process is stopped accordingly. In some embodiments, similar to the method 1000, the new first pose identification pattern corner may be redetermined, and similar to the method 1200, with the new pose identification pattern corner as the starting point for searching, the remaining pose identification pattern corners may be searched.

In some embodiments, in response to the number of the recognized pose identification pattern corners being greater than or equal to a pose identification number threshold, a pose of the end of the operating arm relative to the reference coordinate system may be determined based on the searched pose identification, and the searching for the pose identification pattern corner is also stopped accordingly. For example, when four pose identification pattern corners are recognized, the searching for the pose identification pattern corner is stopped.

In some embodiments, in response to the number of the recognized pose identifications being less than the pose identification number threshold, a pixel with the largest corner likelihood value of the remaining pixels in the set of pixels is determined as a candidate pose identification pattern corner; and the plurality of different pose pattern matching templates are matched with the pattern at the position of the candidate pose identification pattern corner respectively, to recognize the first pose identification. In some embodiments, if the total number of the recognized pose identifications (e.g., pose identification pattern corners) is less than a set pose identification number threshold, it is considered that the searching based on the first pose identification in the above steps fails. In some embodiments, with the searching failing, a pixel with the largest corner likelihood value of the remaining pixels in the set of pixels is determined as a new candidate pose identification pattern corner, and then a new first pose identification may be recognized based on a method similar to the step 1003. In some embodiments, similar to the method 1000, the new first pose identification pattern corner may be redetermined, and similar to the method 1200, with the new pose identification pattern corner as the starting point for searching, the remaining pose identification pattern corners may be searched.

In some embodiments, after the pose identification pattern corner is searched or recognized, the determined pose identification pattern corner may also be subpixel positioned to improve the position accuracy of the pose identification pattern corner.

In some embodiments, the CL values of the pixels may be fitted based on a model, to determine coordinates of the pose identification pattern corners after being subpixel positioned. For example, a fitting function for the CL value of each pixel in the ROI may be a quadric function, and the extreme points of this function are subpixels. The fitting function may be determined based on the following equations (23) and (24):

$$S(x, y) = ax^2 + by^2 + cx + dy + exy + f \quad (23)$$

$$x_c = \frac{de - 2bc}{4ab - e^2}, \; y_c = \frac{ce - 2ad}{4ab - e^2} \quad (24)$$

wherein, $S(x,y)$ is a fitting function for CL values of all pixels in each ROI, a, b, c, d, e, and f are coefficients; $x_c$ is a x-coordinate of the pose identification, and $y_c$ is a y-coordinate of the pose identification.

Continuing to refer to FIG. 3, at step 309, in response to the target pose and the actual pose meeting the error detection condition, a control signal related to a fault is generated. After obtaining the target pose and the actual pose of the end of the operating arm, the control device determines a pose error of the end of the operating arm, to determine whether the operating arm is correctly reached a position and an orientation expected by the operator, and then determine whether the robot system is faulty. In some embodiments, when the target pose and the actual pose of the operating arm meet the error detection condition (e.g., greater than or equal to an error threshold), the control device determines that the operating arm has not correctly moved to the position and an orientation corresponding to the master manipulator, and sends out the control signal association with the fault. For example, the control device may send out a first alarm signal indicating that the control of the operating arm has failed.

In some embodiments, the control device may obtain a plurality of sets of target poses and actual poses of the operating arm in real time in a remote operation, and a running state of the operating arm is comprehensively determined based on the plurality of sets of target poses and actual poses. In some embodiments, the control device may determine the target poses and the actual poses of the end of the operating arm at a predetermined period, perform error detections on the operating arm through a plurality of detection cycles, apply a mathematical statistical method to analyze a plurality of sets of errors, and send out the control signal related to the fault when the error detection condition is met.

For example, in the k-th error detection cycle, a pose difference may be represented as follows:

$$\begin{cases} \varepsilon_p^k = P_t^k - P_r^k \\ \varepsilon_R^k = \Delta\theta\left(R_t^k, R_r^k\right) \end{cases} \quad (25)$$

wherein, $\varepsilon_p^k$ is a position difference of the operating arm in the k-th error detection cycle, $\varepsilon_p^k$ is an angle difference of the operating arm in the k-th error detection cycle, $P_t^k$ is a target position of the operating arm in the k-th error detection cycle, $R_t^k$ is a target orientation of the operating arm in the k-th error detection cycle, $P_r^k$ is an actual position of the operating arm in the k-th error detection cycle, $R_r^k$ is an actual orientation of the operating arm in the k-th error detection cycle, and $\Delta\theta(R_t^k, R_r^k)$ represents a rotating angle between $R_r^k$ and $R_t^k$.

In some embodiments, the control device may store errors obtained in the plurality of detection cycles into a memory, and accumulate these errors. When the accumulated value of the errors meets the error detection condition (e.g., exceeding the threshold), the control device may send out a control signal association with the fault.

In some embodiments, the method 300 further comprises: in response to the target pose and the actual pose meeting the error detection condition, receiving status information of at least one drive device for driving the operating arm; and in response to the status information and drive information of the at least one drive device meeting a fault detection condition, sending out a second alarm signal indicating that the drive device of the operating arm has failed.

In some embodiments, the drive device is provided with a drive device sensor, and the drive device sensor is coupled to the drive device and used to obtain the status information of the drive device. For example, the drive device may include at least one drive motor, the drive device sensor may include a potentiometer or an encoder, and the drive device sensor is coupled with the drive motor to record and output the status information of the motor. The control device sends the drive information to the at least one drive device based on the target pose of the end of the operating arm, and receives, through the drive device sensor, the status information of the at least one drive device for driving the operating arm. When the status information and the drive information meet the fault detection condition (e.g., greater than or equal to an error threshold), the control device sends out a second alarm signal indicating that at least one drive device for driving the operating arm has failed.

In some embodiments of the present disclosure, the present disclosure also provides a computer device comprising a memory and a processor. The memory may be used to store at least one instruction. The processor is coupled to the memory, and is configured to execute the at least one instruction to perform some or all of the steps of the methods of the present disclosure, such as some or all of the steps of the methods shown in FIGS. 3-4, 8-10, 12, 14 and 15.

Figure 16:
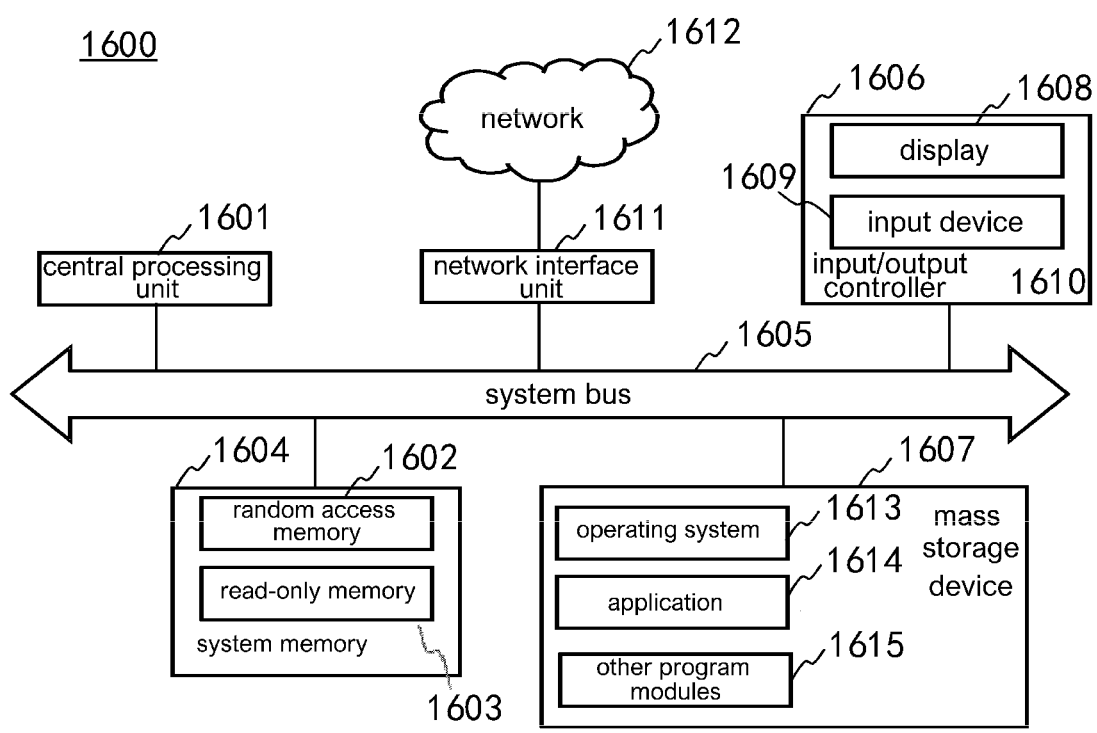
FIG. 16 shows a schematic block diagram of a computer device according to some embodiments of the present disclosure.

FIG. 16 shows a schematic block diagram of a computer device 1600 according to some embodiments of the present disclosure. Referring to FIG. 16, the computer device 1600 may include a central processing unit (CPU) 1601, a system memory 1604 including a random access memory (RAM) 1602 and a read-only memory (ROM) 1603, and a system bus 1605 connecting the various components. The computer device 1600 may further include an input/output system, and a mass storage device 1607 for storing an operating system 1613, application 1614 and other program modules 1615. The input/output device comprises an input/output controller 1610 mainly comprising a display 1608 and an input device 1609.

The mass storage device 1607 is connected to the central processing unit 1601 via a mass storage controller (not shown) connected to the system bus 1605. The mass storage device 1607 or a computer-readable medium provides non-volatile storage for the computer device. The mass storage device 1607 may include a computer-readable medium (not shown) such as a hard disk or a Compact Disc Read-Only Memory (CD-ROM) drive or the like.

Without loss of generality, the computer-readable medium may include a computer storage medium and a communication medium. The computer storage medium includes a volatile and non-volatile, removable and non-removable medium implemented by any of methods or technologies for storing information such as computer-readable instructions, data structures, program modules, or other data and the like. The computer storage medium includes RAM, ROM, a flash memory or other solid-state memory technologies, CD-ROM, or other optical storage, a tape cartridge, a magnetic tape, magnetic disk storage, or other magnetic storage devices. Of course, those skilled in the art will know that the computer storage medium is not limited to the above. The above system memory and mass storage device may be collectively referred to as memory.

The computer device 1600 may be connected to a network 1612 via a network interface unit 1611 connected to the system bus 1605.

The system memory 1604 or the mass storage device 1607 is also used to store one or more instructions. The central processor 1601 implements all or some of the steps of the methods in some embodiments of the present disclosure by executing the one or more instructions.

In some embodiments of the present disclosure, the present disclosure further provides a computer-readable storage medium in which at least one instruction is stored. The at least one instruction is executed by the processor to enable the computer to perform some or all of the steps of the methods in some embodiments of the present disclosure, such as some or all of the steps of the methods disclosed in FIGS. 3-4, 8-10, 12, 14 and 15. Examples of the computer-readable storage medium include a memory for computer programs (instructions), e.g., a read-Only Memory (ROM), a Random Access Memory (RAM), Compact Disc Read-Only Memory (CD-ROM), a magnetic tape, a floppy disk, and an optical data storage device.

FIG. 17 shows a schematic diagram 1700 of a robot system according to some embodiments of the present disclosure. As shown in FIG. 17, the robot system 1700 comprises: a master manipulator 1710, a control device 1720, a drive device 1760, a slave tool 1750, and an image acquisition device 1770. The master manipulator 1710 includes a robotic arm, a handle disposed on the robotic arm, and at least one master manipulator sensor disposed at at least one joint on the robotic arm. The at least one master manipulator sensor is used for obtaining joint information of the at least one joint. In some embodiments, the master manipulator 1710 includes a six-degree-of-freedom robotic arm. One master manipulator sensor is provided at each joint on the six-degree-of-freedom robotic arm, and joint information (e.g., joint angle data) is generated by the master manipulator sensor of each joint. In some embodiments, the master manipulator sensor uses a potentiometer and/or an encoder. An operating arm 1740 is provided on the slave tool 1750, and in some embodiments, the operating arm 1740 comprises a multi-segment continuum deformable arm. The end 1730 of the operating arm 1740 may be formed or provided with a plurality of pose identifications including different pose identification patterns, and an effector may be provided at a distal end of the end 1730. The image acquisition device 1770 may be used to acquire a positioning image of the operating arm 1740. The drive device 1760 is used for driving the operating arm 1740, and at least one drive device sensor is coupled with at least one drive device and for obtaining drive information. The control device 1720 is communicatively connected to the master manipulator 1710, the at least one drive device 1760 and the image acquisition device 1770, and is configured to perform some or all of the steps in the methods of some embodiments of the present application, such as some or all of the steps in the methods disclosed in FIGS. 3-4, 8-10, 12, 14 and 15.

The robot has a high requirement for operation accuracy and human-computer interaction experience. During an operation of the robot system, if the operating arm cannot move to a target position and orientation accurately and quickly, it will reduce the operation experience of an operator, and even lead to a failure of an operation, resulting in unnecessary risks. In the embodiments of the present disclosure, by detecting the actual pose of the operating arm, and comparing it, in real time, with the target pose of the operating arm desired by the operator, the risk of fault existed may be found. The embodiments of the present disclosure may improve an operability and safety of the robot system, and reduce an operational risk caused by a pose error of the operating arm during the operation of the robot system.

Note that the above are only exemplary embodiments of the present disclosure and the applied technical principles. Those skilled in the art will appreciate that the present disclosure is not limited to specific embodiments herein, and those skilled in the art can make various apparent changes, readjustments and substitutions without departing from the scope of protection of the present disclosure. Thus, although the present disclosure is described in more detail by the above embodiments, the present disclosure is not limited to the above embodiments. Without departing from the concept of the present disclosure, more other equivalent embodiments may be included, and the scope of the present disclosure is determined by the scope of the appended claims.

The invention claimed is:

1. An error detection method comprising:
obtaining a target pose of an end of an operating arm;
acquiring a positioning image;
recognizing, in the positioning image, a plurality of pose identifications located on the end of the operating arm, the plurality of pose identifications including different pose identification patterns;
determining, based on the plurality of pose identifications, an actual pose of the end of the operating arm; and
generating, in response to the target pose and the actual pose meeting an error detection condition, a control signal related to a fault,
wherein recognizing the plurality of pose identifications located on the end of the operating arm comprises:
determining a plurality of candidate pose identifications from the positioning image;

recognizing a first pose identification from the plurality of candidate pose identifications based on a plurality of different pose pattern matching templates; and
searching for a pose identification, with the first pose identification as a starting point.

2. The method according to claim 1, wherein obtaining the target pose of the end of the operating arm comprises:
determining a current pose of a master manipulator; and
determining, based on the current pose of the master manipulator and a pose relationship between the master manipulator and the end of the operating arm, the target pose of the end of the operating arm.

3. The method according to claim 2, wherein the pose relationship comprises at least one of:
an amount of position change of the end of the operating arm in a reference coordinate system being proportional to an amount of position change of the master manipulator in the reference coordinate system; or
an amount of orientation change of the end of the operating arm in the reference coordinate system being consistent with an amount of orientation change of the master manipulator in the reference coordinate system; or
an orientation of the end of the operating arm in the reference coordinate system being consistent with an orientation of the master manipulator in the reference coordinate system.

4. The method according to claim 2, further comprising:
determining a current pose of a handle of the master manipulator relative to a master manipulator base coordinate system;
determining a previous pose of the handle relative to the master manipulator base coordinate system;
determining a starting pose of the end of the operating arm relative to an operating arm base coordinate system; and
determining a target pose of the end of the operating arm relative to the operating arm base coordinate system based on the previous pose and the current pose of the handle relative to the master manipulator base coordinate system, a transformation relationship between the operating arm base coordinate system and the master manipulator base coordinate system, and the starting pose of the end of the operating arm relative to the operating arm base coordinate system.

5. The method according to claim 4, further comprising:
determining the transformation relationship between the operating arm base coordinate system and the master manipulator base coordinate system based on a transformation relationship between the operating arm base coordinate system and a camera coordinate system, a transformation relationship between the camera coordinate system and a display coordinate system, and a transformation relationship between the display coordinate system and the master manipulator base coordinate system.

6. The method according to claim 1, further comprising:
determining around-axis angles of the plurality of pose identifications relative to a Z-axis of an end coordinate system of the operating arm based on a distribution of the plurality of pose identifications; and
determining three-dimensional coordinates of the plurality of pose identifications relative to the end coordinate system of the operating arm based on the around-axis angles of the plurality of pose identifications.

7. The method according to claim 6, further comprising:
determining two-dimensional coordinates of the plurality of pose identifications in the positioning image; and
determining a pose of the end coordinate system of the operating arm relative to the reference coordinate system as the actual pose based on the two-dimensional coordinates of the plurality of pose identifications in the positioning image and the three-dimensional coordinates of the plurality of pose identifications relative to the end coordinate system of the operating arm.

8. The method according to claim 1, wherein the pose identification comprises a pose identification pattern corner in the pose identification pattern, the method comprises:
determining a region of interest in the positioning image;
dividing the region of interest into plurality of subregions;
determining a pixel with a largest corner likelihood value in each of the subregions to form a set of pixels;
determining a pixel with a largest corner likelihood value in the sets of pixels as a candidate pose identification pattern corner; and
matching the plurality of different pose pattern matching templates with a pattern at a position of the candidate pose identification pattern corner respectively, to recognize the first pose identification.

9. The method according to claim 8, comprising:
determining, in response to the matching failing, a pixel with a largest corner likelihood value of the remaining pixels in the set of pixels, as a candidate pose identification pattern corner.

10. The method according to claim 1, further comprising:
searching for a second pose identification, with the first pose identification as a starting point;
determining a searching direction based on the first pose identification and the second pose identification; and
searching for a pose identification in the searching direction, with the first pose identification or the second pose identification as a starting point.

11. The method according to claim 10, wherein searching for a second pose identification with the first pose identification as a starting point comprises:
searching for a candidate pose identification pattern corner of the second pose identification, with the first pose identification as the starting point;
determining a first pose pattern matching template and a second pose pattern matching template based on a distribution of the plurality of pose identifications, the first pose pattern matching template and the second pose pattern matching template corresponding to pose identifications adjacent to the first pose identification; and
matching the first pose pattern matching template and/or the second pose pattern matching template with a pattern at a position of the candidate pose identification pattern corner of the second pose identification, to recognize the second pose identification.

12. The method according to claim 10, wherein searching for a pose identification in the searching direction with the first pose identification or the second pose identification as a starting point comprises:
searching for a candidate pose identification pattern corner of the third pose identification, with the first pose identification or the second pose identification as the starting point;
determining a third pose pattern matching template based on a distribution of the plurality of pose identifications; the third pose pattern matching template corresponding to a pose identification adjacent to the first pose identification or adjacent to the second pose identification; and matching the third pose pattern matching template with a pattern at a position of the candidate pose identification pattern corner of the third pose identification, to recognize the third pose identification.

13. The method according to claim 10, further comprising:
determining, in response to a searching distance being greater than a searching distance threshold, a pixel with a largest corner likelihood value of the remaining pixels in the set of pixels as a candidate pose identification pattern corner; and
matching the plurality of different pose pattern matching templates with a pattern at a position of the candidate pose identification pattern corner respectively, to recognize the first pose identification.

14. The method according to claim 10, further comprising:
determining, in response to the number of the recognized pose identifications being less than a pose identification number threshold, a pixel with the largest corner likelihood value of the remaining pixels in the set of pixels as a candidate pose identification pattern corner; and
matching the plurality of different pose pattern matching templates with a pattern at a position of the candidate pose identification pattern corner respectively, to recognize the first pose identification.

15. The method according to claim 1, further comprising:
determining an arrangement order of the plurality of pose identifications based on at least two of the plurality of pose identifications; and
determining three-dimensional coordinates of the plurality of pose identifications relative to an end coordinate system of the operating arm based on the arrangement order of the plurality of pose identifications.

16. The method according to claim 1, wherein the control signal related to the fault comprises a first alarm signal indicating that the control of the operating arm has failed.

17. The method according to claim 1, further comprising:
receiving status information of at least one drive device for driving the operating arm in response to the target pose and the actual pose meeting an error detection condition; and
sending out a second alarm signal in response to the status information and drive information of the at least one drive device meeting a fault detection condition, the second alarm signal indicating that a drive device of the operating arm has failed.

18. The method according to claim 1, further comprising:
determining target pose and actual pose of the end of the operating arm at a predetermined period, to perform error detections on the operating arm in real time by a plurality of detection cycles.

19. A non-transitory computer-readable storage medium for storing at least one instruction that when executed by a computer, causes the computer to perform the error detection method according to claim 1.

20. A robot system comprising:
a master manipulator including a robotic arm, a handle disposed on the robotic arm, and at least one master manipulator sensor disposed at at least one joint on the robotic arm, the at least one master manipulator sensor for obtaining joint information of the at least one joint;
an operating arm provided with a plurality of pose identifications at its end, the plurality of pose identifications including different pose identification patterns;
at least one drive device for driving the operating arm;
at least one drive device sensor coupled with the at least one drive device and for obtaining status information of the at least one drive device;
the image acquisition device for acquiring a positioning image of the operating arm; and
a control device configured to be connected with the master manipulator, the at least one drive device, the at least one drive device sensor, and the image acquisition device, and perform the error detection method according to claim 1.

* * * * *